(12) United States Patent
Mezghani et al.

(10) Patent No.: US 9,626,771 B2
(45) Date of Patent: Apr. 18, 2017

(54) IMAGE-BASED ANALYSIS OF A GEOLOGICAL THIN SECTION

(71) Applicant: Saudi Arabian Oil Company, Dhahran (SA)

(72) Inventors: Mokhles Mustapha Mezghani, Dhahran (SA); Salem Hamoud Shammari, Dammam (SA)

(73) Assignee: Saudi Arabian Oil Company, Dhahran (SA)

( * ) Notice: Subject to any disclaimer, the term of this patent is extended or adjusted under 35 U.S.C. 154(b) by 0 days.

(21) Appl. No.: 15/082,540

(22) Filed: Mar. 28, 2016

(65) Prior Publication Data

US 2016/0343150 A1 Nov. 24, 2016

Related U.S. Application Data

(60) Provisional application No. 62/164,292, filed on May 20, 2015.

(51) Int. Cl.
*G06T 7/60* (2017.01)
*G06T 7/00* (2017.01)
(Continued)

(52) U.S. Cl.
CPC .............. *G06T 7/60* (2013.01); *G06K 9/4604* (2013.01); *G06K 9/4652* (2013.01); *G06K 9/52* (2013.01); *G06K 9/6267* (2013.01); *G06T 3/60* (2013.01); *G06T 7/0042* (2013.01); *G06T 7/0081* (2013.01); *G06T 7/0085* (2013.01); *G06T 7/0097* (2013.01); *G06T 7/408* (2013.01); *G06T 11/60* (2013.01); *G06T 2207/10016* (2013.01); *G06T 2207/10056* (2013.01); *G06T 2207/10152* (2013.01); *G06T 2207/20141* (2013.01); *G06T 2207/20156* (2013.01); *G06T 2207/20221* (2013.01); *G06T 2207/30181* (2013.01)

(58) Field of Classification Search
None
See application file for complete search history.

(56) References Cited

U.S. PATENT DOCUMENTS

| 8,583,410 B2 * | 11/2013 | Sisk | ........................ G01N 33/24 702/6 |
| 2015/0293257 A1 * | 10/2015 | Liebich | .................. A01C 21/00 701/50 |

OTHER PUBLICATIONS

Tarquini et al., "A Microscopic information System (MIS) for Petrographic Analysis," Computers and Geosciences, vol. 36, No. 5, May 1, 2010, pp. 665-674.

(Continued)

*Primary Examiner* — Shervin Nakhjavan
(74) *Attorney, Agent, or Firm* — Fish & Richardson P.C.

(57) ABSTRACT

Techniques for an image-based analysis of a geological thin section include (i) acquiring a plurality of images from a geological thin section of a rock sample from a subterranean zone; (ii) manipulating the plurality of images to derive a composite image; (iii) optimizing the composite image to derive a seed image; (iv) identifying, in the seed image, a particular seed pixel of a plurality of contiguous pixels that comprise an image of a grain of a plurality of grains of the rock sample in the seed image; (v) determining, with a specified algorithm, a shape of the grain based on the seed pixel; (vi) determining, based on the shape of the grain, a size of the grain; and (vii) preparing the determination of the size of the grain for presentation to a user.

28 Claims, 25 Drawing Sheets

(51) Int. Cl.
  *G06K 9/46* (2006.01)
  *G06K 9/52* (2006.01)
  *G06K 9/62* (2006.01)
  *G06T 3/60* (2006.01)
  *G06T 7/40* (2017.01)
  *G06T 11/60* (2006.01)

(56) References Cited

OTHER PUBLICATIONS

Iglesias et al., "Automatic recognition of hematite grains under polarized reflected light microscopy through image anaiysis," Minerals Engineering, Pergamon Press: Oxford, GB, vol. 24, No. 12, Apr. 12, 2011, pp. 1264-1270.
Li et al., "GIS-based detection of grain boundaries," Journal of Structural Geology, Pergamon Press, vol. 30, No. 4, Dec. 27, 2007, pp. 431-443.
International Search Report and Written Opinion issued in International Application No. PCT/US2016/029748 on Aug. 5, 2016.
Bartozzi et al., "Automated Grain Boundary Detection and Classification in Orientation Contrast Images", Journal of Structural Geology, Copyright 2000, pp. 1569-1579.
Buscombe, "Estimation of Grain-Size Distributions and Associated Parameters from Digital Images of Sediment", Sedimentary Geology, Copyright 2008, pp. 1-10.
Choudhury et al., "Automated Grain Boundary Detection by CASRG", Journal of Structural Geology, Copyright 2006, pp. 363-375.
Francus, "An Image-Analysis Technique to Measure Grain-Size Variation in Thin Sections of Soft Clastic Sediments", Sedimentary Geology, Copyright 1998, pp. 289-298.
Fueten, "A Computer-Controlled Rotating Polarizer Stage for the Petrographic Microscope", Computers & Geosciences, vol. 23, No. 2, Copyright 1997, pp. 203-208.
Heilbronner, "Automatic Grain Boundary Detection and Grain Size Analysis Using Polarization Micrographs or Orientation Images", Journal of Structural Geology, Copyright 2000, pp. 969-981.
Obara et al., "Utilisation of the Image Analysis Method for the Detection of the Morphological Anisotropy of Calcite Grains in Marble", Computer Geoscience, Copyright 2007, 7 pages.
Obara, "An Image Processing Algorithm for the Reversed Transformation of Rotated Microscope Images", Computers & Geosciences, Copyright 2007, pp. 853-859.
Starkey et al., "A Microcomputer-Based System for Quantitative Petrographic Analysis", Computers & Geosciences, vol. 20, No. 9, Copyright 1994, pp. 1285-1296.
Zhou et al., "Segementation of Petrographic Images by Integrating Edge Detection and Region Growing", Computers & Geosciences, Copyright 2004, pp. 817-831.

* cited by examiner

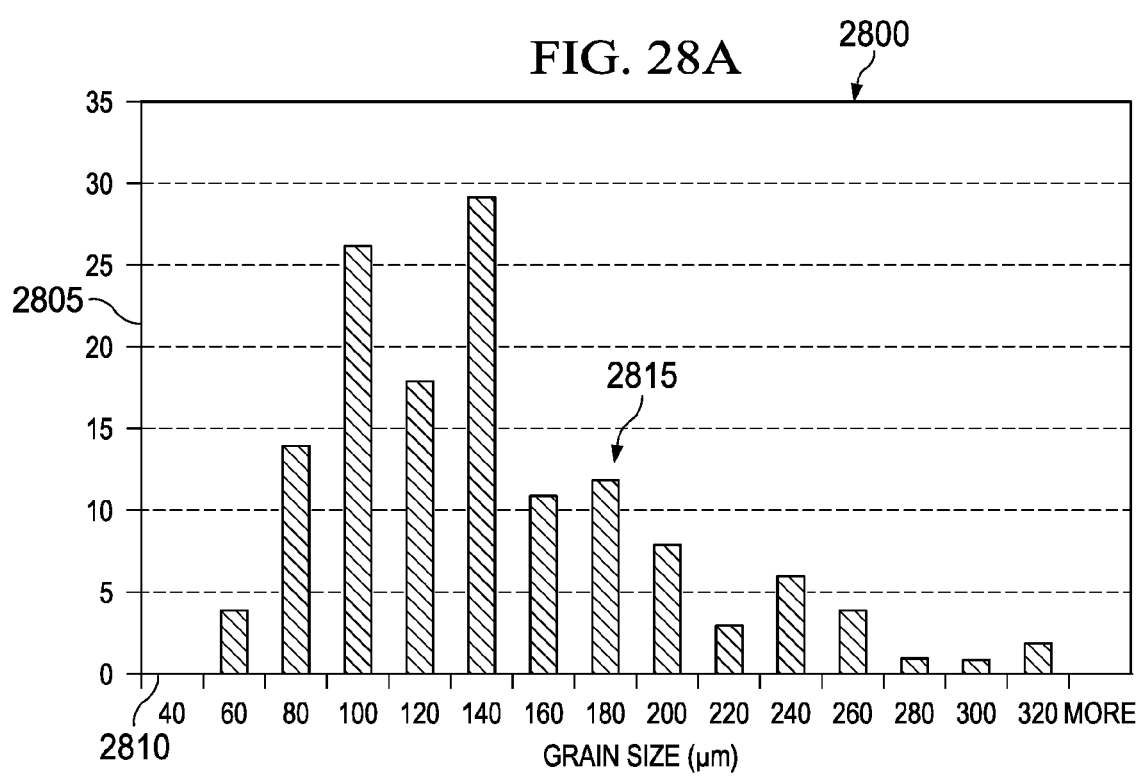
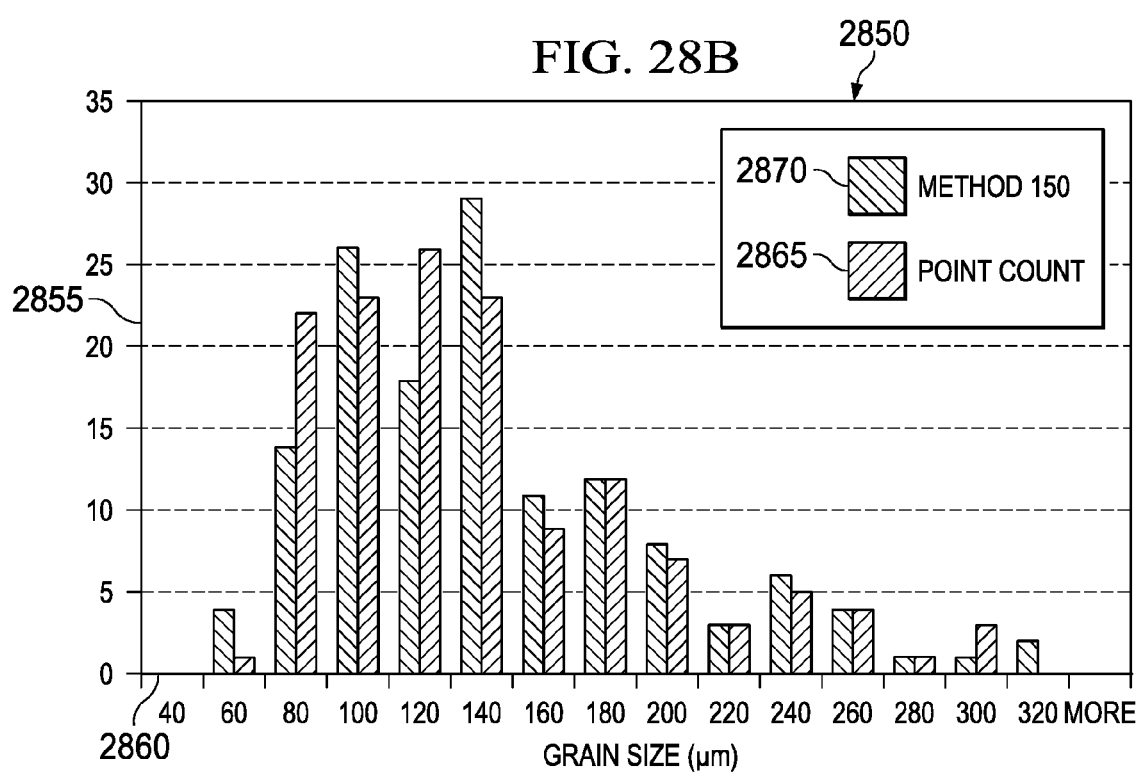

IMAGE-BASED ANALYSIS OF A GEOLOGICAL THIN SECTION

CROSS-REFERENCE TO RELATED APPLICATION

This application claims priority under 35 U.S.C. §119 to U.S. Provisional Patent Application Ser. No. 62/164,292, filed May 20, 2015, and entitled "Image-Based Analysis of a Geological Thin Section," the entire contents of which are incorporated by reference herein.

TECHNICAL FIELD

This disclosure relates to geological thin section analysis and, more particularly, to methods and systems for an image-based analysis of a geological thin section.

BACKGROUND

A common issue in geological petrography work is the analysis of thin sections. An example of this is the petrographic study of rock samples, for example, mineral composition, texture, and otherwise. Information can be inferred from the thin sections by geologists and petrographers. This information includes, but is not limited to, detrital constituents, texture, clays, matrix, cement, and porosity. Since hydrocarbon fluids may be found in the pore spaces between the detrital grains, the analysis of thin sections is an example technique for the examination of rocks and the evaluation of their different parameters. Hence, the study of geological thin sections (for example, sedimentary petrography) has become one of the important disciplines for hydrocarbon exploration.

Conventionally, thin section analysis has been determined by a point counting method performed on the thin section. Although point counting is very time consuming, it is of common use in several domains including geology, biology, medicine, and materials sciences, among others. Point counting in thin sections is normally conducted through mechanical or electromechanical devices attached to a microscope. Such mechanical or electromechanical devices can be very expensive, and offer limited functionality. Point counting may also require an extensive cognitive workload for a geologist. Further, the final results of the point counting analysis may be subjective and dependent on the geologist's appreciation and expertise.

SUMMARY

This disclosure describes implementations of methods and systems for a geological thin section analysis. In some example implementations, an automated workflow process determines sizes and size distribution of a number of grains of a geological thin section. The automated workflow process acquires a number of images of the geological thin section with a polarizing microscope system, manipulates the images, and automatically applies an iterative algorithmic process to the manipulated images to determine grain shape and size of the grains of the geological thin section.

In a general implementation, a computer-implemented method for an image-based analysis of a geological thin section includes (i) acquiring a plurality of images from a geological thin section of a rock sample from a subterranean zone; (ii) manipulating the plurality of images to derive a composite image; (iii) optimizing the composite image to derive a seed image; (iv) identifying, in the seed image, a particular seed pixel of a plurality of contiguous pixels that comprise an image of a grain of a plurality of grains of the rock sample in the seed image; (v) determining, with a specified algorithm, a shape of the grain based on the seed pixel; (vi) determining, based on the shape of the grain, a size of the grain; and (vii) preparing the determination of the size of the grain for presentation to a user.

An aspect combinable with the general implementation further includes determining, based on the shape of the grain, at least one of a sphericity, a roundness, an elongation, or a sharpness of the grain.

Another aspect combinable with any of the previous aspects further includes generating an updated composite image to remove the shape of the grain from the composite image.

In another aspect combinable with any of the previous aspects, generating an updated composite image to remove the shape of the grain from the composite image comprises setting the plurality of contiguous pixels that comprise the image of the grain to nil values.

In another aspect combinable with any of the previous aspects, acquiring a plurality of images from a geological thin section of a rock sample from a subterranean zone comprises acquiring at least one plane-polarized image from the geological thin section; and acquiring at least two cross-polarized images from the geological thin section.

In another aspect combinable with any of the previous aspects, acquiring at least one plane-polarized image from the geological thin section comprises acquiring four plane-polarized images from the geological thin section, and acquiring at least two cross-polarized images from the geological thin section comprises acquiring four cross-polarized images from the geological thin section.

In another aspect combinable with any of the previous aspects, acquiring four plane-polarized images from the geological thin section comprises acquiring four plane-polarized images, each rotated at a distinct angle relative to a zero position angle, from the geological thin section.

In another aspect combinable with any of the previous aspects, acquiring four cross-polarized images from the geological thin section comprises acquiring four cross-polarized images, each rotated at the distinct angle relative to the zero position angle, from the geological thin section.

In another aspect combinable with any of the previous aspects, the distinct angles comprise 0 degrees, 25 degrees, 45 degrees, and 65 degrees from the zero position angle.

In another aspect combinable with any of the previous aspects, manipulating the plurality of images to derive a composite image comprises registering the plurality of images.

In another aspect combinable with any of the previous aspects, registering the plurality of images comprises applying a rotational transformation to each of the plurality of images with a rotation angle equal to an opposite value of the distinct angles relative to the zero position angle.

Another aspect combinable with any of the previous aspects further includes determining a rotational center for each of the plurality of images about which to apply the rotational transformation.

In another aspect combinable with any of the previous aspects, determining a rotational center comprises executing a numerical algorithm to obtain the rotational center.

In another aspect combinable with any of the previous aspects, manipulating the plurality of images to derive a composite image further comprises generating a first composite image.

In another aspect combinable with any of the previous aspects, the first composite image is generated by applying an edge detection algorithm to the at least two cross-polarized images.

In another aspect combinable with any of the previous aspects, the edge detection algorithm comprises a Sobel algorithm.

In another aspect combinable with any of the previous aspects, the first composite image comprises an aggregation of a plurality of first composite images, with each first composite image corresponding to a particular one of the plurality of cross-polarized images.

In another aspect combinable with any of the previous aspects, manipulating the plurality of images to derive a composite image further comprises generating a second composite image.

In another aspect combinable with any of the previous aspects, the second composite image comprises a combined cross-polarized image based on the first composite image.

In another aspect combinable with any of the previous aspects, the combined cross-polarized image comprises an average cross-polarized image based on the plurality of first composite images.

In another aspect combinable with any of the previous aspects, manipulating the plurality of images to derive a composite image further comprises generating a third composite image.

In another aspect combinable with any of the previous aspects, the third composite image comprises a segmented image of the at least one plane-polarized image.

Another aspect combinable with any of the previous aspects further includes generating the segmented image of the at least one plane-polarized image by determining a cut-off value of a color that distinguishes the grain of the geological thin section and a pore of the geological thin section; and applying the cut-off value to the at least one plane-polarized image.

In another aspect combinable with any of the previous aspects, the determined cut-off value is based on a color of an epoxy of the geological thin section.

In another aspect combinable with any of the previous aspects, manipulating the plurality of images to derive a composite image comprises generating a final composite image used to derive the seed image by tagging grain edges of the plurality of grains in the third composite image based on the first composite image to create the final composite image.

In another aspect combinable with any of the previous aspects, optimizing the composite image to derive the seed image comprises generating a first seed image based on an average of the final composite image; and generating a second seed image based on an absolute deviation or a standard deviation of the first seed image.

Another aspect combinable with any of the previous aspects further includes generating a third seed image by assigning, in the second seed image, an absolute deviation value for each pixel in the second seed image that comprises an average value lower than a threshold.

Another aspect combinable with any of the previous aspects further includes selecting the seed pixel from the third seed image based on the lowest average value of the pixels.

In another aspect combinable with any of the previous aspects, the specified algorithm comprises a seeded region growing algorithm (SRG), the method further comprising adding the seed pixel to a sequential search list (SSL) queue.

In another aspect combinable with any of the previous aspects, determining, with the specified algorithm, a shape of the grain based on the seed pixel comprises selecting the seed pixel from the SSL queue.

Another aspect combinable with any of the previous aspects further includes, for each of a plurality of neighboring pixels adjacent the seed pixel, determining a similarity of the neighboring pixel to the seed pixel; and based on the similarity of the neighboring pixel meeting a threshold similarity, adding the neighboring pixel to the grain shape.

In another aspect combinable with any of the previous aspects, the plurality of neighboring pixels comprises eight neighboring pixels adjacent the seed pixel.

In another aspect combinable with any of the previous aspects, the similarity comprises a color similarity.

In another aspect combinable with any of the previous aspects, determining a similarity of the neighboring pixel to the seed image comprises measuring a Euclidean distance between a color vector of the seed pixel and a color vector of the neighboring pixel, and the threshold similarity comprises a maximum value of the Euclidean distance.

In another aspect combinable with any of the previous aspects, the threshold similarity is determined based on an absolute deviation of the color vectors of the plurality of neighboring pixels and the color vector of the seed pixel.

Another aspect combinable with any of the previous aspects further includes selecting another seed pixel from the SSL queue; and for each of a plurality of neighboring pixels adjacent the other seed pixel, determining a similarity of the neighboring pixel to the other seed pixel; and based on the similarity of the neighboring pixel meeting a threshold similarity, adding the neighboring pixel to another grain shape.

In another aspect combinable with any of the previous aspects, determining, based on the shape of the grain, a size of the grain comprises at least one of determining a length of a longest segment inside the grain; or determining a diameter of a circumscribed circle of the grain.

Another aspect combinable with any of the previous aspects further includes executing an iterative process by repeating steps (iii)-(vi) for another grain of the plurality of grains of the rock sample.

Another aspect combinable with any of the previous aspects further includes stopping the iterative process when the determined grain size of a particular grain of the plurality of grains is less than a specified threshold grain size.

Another aspect combinable with any of the previous aspects further includes graphically displaying, to a user, a grain size distribution of the determined grain sizes of the plurality of grains in the rock sample.

In another aspect combinable with any of the previous aspects, the rock sample comprises an anisotropic rock sample or a clastic rock sample.

In another general implementation, a system for an image-based analysis of a geological thin section includes a polarizing microscope; and a control system that comprises a memory and one or more processors. The memory includes instructions operable when executed by the one or more processors to perform operations comprising (i) acquiring a plurality of images from a geological thin section of a rock sample from a subterranean zone; (ii) manipulating the plurality of images to derive a composite image; (iii) optimizing the composite image to derive a seed image; (iv) identifying, in the seed image, a particular seed pixel of a plurality of contiguous pixels that comprise an image of a grain of a plurality of grains of the rock sample in the seed image; (v) determining, with a specified algorithm, a shape of the grain based on the seed pixel; (vi) determining, based on the shape of the grain, a size of the grain; and (vii) preparing the determination of the size of the grain for presentation to a user.

In an aspect combinable with the general implementation, the operations further comprise determining, based on the shape of the grain, at least one of a sphericity, a roundness, an elongation, or a sharpness of the grain.

In another aspect combinable with any of the previous aspects, the operations further comprise generating an updated composite image to remove the shape of the grain from the composite image.

In another aspect combinable with any of the previous aspects, generating an updated composite image to remove the shape of the grain from the composite image comprises setting the plurality of contiguous pixels that comprise the image of the grain to nil values.

In another aspect combinable with any of the previous aspects, acquiring a plurality of images from a geological thin section of a rock sample from a subterranean zone comprises acquiring at least one plane-polarized image from the geological thin section; and acquiring at least two cross-polarized images from the geological thin section.

In another aspect combinable with any of the previous aspects, acquiring at least one plane-polarized image from the geological thin section comprises acquiring four plane-polarized images from the geological thin section, and acquiring at least two cross-polarized images from the geological thin section comprises acquiring four cross-polarized images from the geological thin section.

In another aspect combinable with any of the previous aspects, acquiring four plane-polarized images from the geological thin section comprises acquiring four plane-polarized images, each rotated at a distinct angle relative to a zero position angle, from the geological thin section, and acquiring four cross-polarized images from the geological thin section comprises acquiring four cross-polarized images, each rotated at the distinct angle relative to the zero position angle, from the geological thin section.

In another aspect combinable with any of the previous aspects, the distinct angles comprise 0 degrees, 25 degrees, 45 degrees, and 65 degrees from the zero position angle.

In another aspect combinable with any of the previous aspects, manipulating the plurality of images to derive a composite image comprises registering the plurality of images.

In another aspect combinable with any of the previous aspects, registering the plurality of images comprises applying a rotational transformation to each of the plurality of images with a rotation angle equal to an opposite value of the distinct angles relative to the zero position angle.

In another aspect combinable with any of the previous aspects, the operations further comprise determining a rotational center for each of the plurality of images about which to apply the rotational transformation.

In another aspect combinable with any of the previous aspects, determining a rotational center comprises executing a numerical algorithm to obtain the rotational center.

In another aspect combinable with any of the previous aspects, manipulating the plurality of images to derive a composite image further comprises generating a first composite image.

In another aspect combinable with any of the previous aspects, the first composite image is generated by applying an edge detection algorithm to the at least two cross-polarized images.

In another aspect combinable with any of the previous aspects, the edge detection algorithm comprises a Sobel algorithm.

In another aspect combinable with any of the previous aspects, the first composite image comprises an aggregation of a plurality of first composite images, with each first composite image corresponding to a particular one of the plurality of cross-polarized images.

In another aspect combinable with any of the previous aspects, manipulating the plurality of images to derive a composite image further comprises generating a second composite image.

In another aspect combinable with any of the previous aspects, the second composite image comprises a combined cross-polarized image based on the first composite image.

In another aspect combinable with any of the previous aspects, the combined cross-polarized image comprises an average cross-polarized image based on the plurality of first composite images.

In another aspect combinable with any of the previous aspects, manipulating the plurality of images to derive a composite image further comprises generating a third composite image.

In another aspect combinable with any of the previous aspects, the third composite image comprises a segmented image of the at least one plane-polarized image.

In another aspect combinable with any of the previous aspects, the operations further comprise generating the segmented image of the at least one plane-polarized image by determining a cut-off value of a color that distinguishes the grain of the geological thin section and a pore of the geological thin section; and applying the cut-off value to the at least one plane-polarized image.

In another aspect combinable with any of the previous aspects, the determined cut-off value is based on a color of an epoxy of the geological thin section.

In another aspect combinable with any of the previous aspects, manipulating the plurality of images to derive a composite image comprises generating a final composite image used to derive the seed image by tagging grain edges of the plurality of grains in the third composite image based on the first composite image to create the final composite image.

In another aspect combinable with any of the previous aspects, optimizing the composite image to derive the seed image comprises generating a first seed image based on an average of the final composite image; and generating a second seed image based on an absolute deviation or a standard deviation of the first seed image.

In another aspect combinable with any of the previous aspects, the operations further comprise generating a third seed image by assigning, in the second seed image, an absolute deviation value for each pixel in the second seed image that comprises an average value lower than a threshold.

In another aspect combinable with any of the previous aspects, the operations further comprise selecting the seed pixel from the third seed image based on the lowest average value of the pixels.

In another aspect combinable with any of the previous aspects, the specified algorithm comprises a seeded region growing algorithm (SRG), the method further comprising adding the seed pixel to a sequential search list (SSL) queue.

In another aspect combinable with any of the previous aspects, determining, with the specified algorithm, a shape of the grain based on the seed pixel comprises selecting the seed pixel from the SSL queue; and for each of a plurality of neighboring pixels adjacent the seed pixel, determining a similarity of the neighboring pixel to the seed pixel; and based on the similarity of the neighboring pixel meeting a threshold similarity, adding the neighboring pixel to the grain shape.

In another aspect combinable with any of the previous aspects, the plurality of neighboring pixels comprises eight neighboring pixels adjacent the seed pixel.

In another aspect combinable with any of the previous aspects, the similarity comprises a color similarity.

In another aspect combinable with any of the previous aspects, determining a similarity of the neighboring pixel to the seed image comprises measuring a Euclidean distance between a color vector of the seed pixel and a color vector of the neighboring pixel, and the threshold similarity comprises a maximum value of the Euclidean distance.

In another aspect combinable with any of the previous aspects, the threshold similarity is determined based on an absolute deviation of the color vectors of the plurality of neighboring pixels and the color vector of the seed pixel.

In another aspect combinable with any of the previous aspects, the operations further comprise selecting another seed pixel from the SSL queue; and for each of a plurality of neighboring pixels adjacent the other seed pixel, determining a similarity of the neighboring pixel to the other seed pixel; and based on the similarity of the neighboring pixel meeting a threshold similarity, adding the neighboring pixel to another grain shape.

In another aspect combinable with any of the previous aspects, determining, based on the shape of the grain, a size of the grain comprises at least one of determining a length of a longest segment inside the grain; or determining a diameter of a circumscribed circle of the grain.

In another aspect combinable with any of the previous aspects, the operations further comprise executing an iterative process by repeating steps (iii)-(vi) for another grain of the plurality of grains of the rock sample.

In another aspect combinable with any of the previous aspects, the operations further comprise stopping the iterative process when the determined grain size of a particular grain of the plurality of grains is less than a specified threshold grain size.

In another aspect combinable with any of the previous aspects, the operations further comprise graphically displaying, to a user, a grain size distribution of the determined grain sizes of the plurality of grains in the rock sample.

In another aspect combinable with any of the previous aspects, the rock sample comprises an anisotropic rock sample or a clastic rock sample.

Implementations of methods and systems for a geological thin section workflow analysis according to the present disclosure may include one or more of the following features. For example, the workflow may include a high level of automation that offers an accurate thin section analysis in much less time than can be accomplished with traditional petrographic methods like point counting (tenths of seconds of computation as compared to couple of hours of human manipulations). The workflow may significantly reduce the time required to conduct thin section analysis. As another example, the workflow may minimize a cognitive workload of a human user (for example, a geologist). Further, the workflow may reduce human errors associated with conventional point counting methods. In addition, the workflow does not require an expensive ad hoc device to perform geological thin section analysis. As another example, the workflow may improve grain counting consistency compared to traditional methods. In addition, the workflow may allow geological thin section analysis to be conducted by a non-geologist.

The details of one or more implementations of the subject matter described in this disclosure are set forth in the accompanying drawings and the description below. Implementations may be in the form of systems, methods, apparatus, and computer-readable media. For example, a system of one or more computers can be configured to perform particular actions by virtue of having software, firmware, hardware, or a combination of them installed on the system that in operation causes or cause the system to perform the actions. One or more computer programs can be configured to perform particular actions by virtue of including instructions that, when executed by data processing apparatus, cause the apparatus to perform the actions. Features, aspects, and advantages of the subject matter will become apparent from the description, the drawings, and the claims.

BRIEF DESCRIPTION OF THE DRAWINGS

FIG. 28A illustrates a graph that shows grain size range of a geological thin section determined by an example method for an image-based analysis of the geological thin section.

FIG. 28B illustrates a graph that shows grain size range of a geological thin section determined by an example method for an image-based analysis of the geological thin section as compared to a conventional point counting method of the geological thin section.

DETAILED DESCRIPTION

Figure 1A:
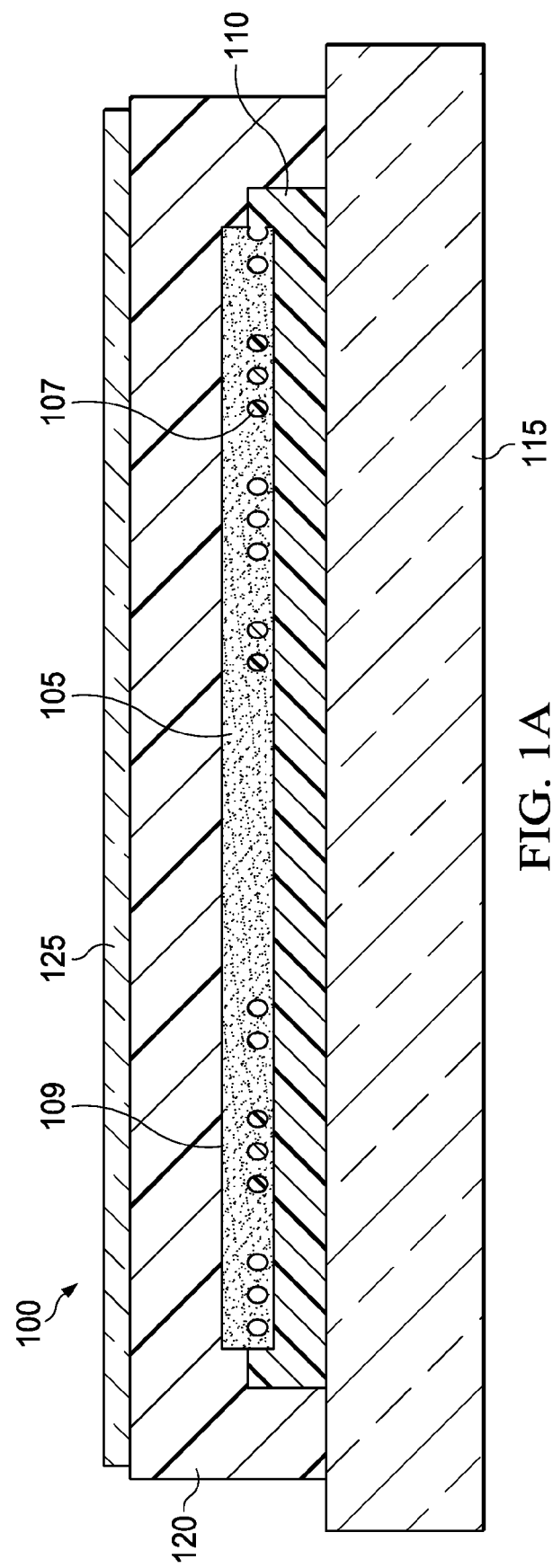
FIG. 1A is a schematic diagram of a geological thin section.

FIG. 1A is a schematic diagram of a geological thin section 100 (also called a petrographic thin section). The geological thin section 100 may be used by geologists to examine rocks (from outcrops, cores, and cuttings) under, for example, a polarized microscope system 200 shown in FIG. 2. Geologists and petrographers can infer information from the geological thin section 100, such as, for example, detrital constituents, texture, clays, matrix, cement, and porosity. Grain texture is a particular parameter that is used in determining clastic sediments, because texture is the product of the depositional processes. The analysis of grain texture in the geological thin section 100 involves concerns of grain-size parameters, grain surface and grain morphology. Understanding the textural characteristics is one effective exploration tool to accurately evaluate reservoir rocks. Knowing these parameters can help petrographers learn about the depositional processes and interpret the depositional environments at which these sediments deposited. Moreover, grain or rock texture of the geological thin section 100 can give information about the flow conditions and reservoir quality of the rock formation from which the geological thin section 100 was taken.

As illustrated, the geological thin section 100 includes glass slide 115 onto which a rock sample 105 is placed. The rock sample 105 is placed in a dye epoxy 110 to secure the sample 105 to the glass slide 115. Another layer of epoxy 120 is placed over the rock sample 105. A cover slip 125 is placed on top of the epoxy 120. As illustrated, the rock sample 105 includes pores 107 (for example, voids in the rock). To make the geological thin section 100, different types of saws, grinders, and lap wheels are used. A general procedure to make the geological thin section 100 includes: (1) impregnate the rock sample 105 with the dye epoxy 110, (2) let the rock sample 105 dry, (3) flatten the rock sample 105, (4) glue the rock sample 105 to the glass slide 115, (5) place the rock sample 105 in a ponding jig/ultra-light, (6) make the rock sample 105 thinner using the saw, (7) adjust the rock sample 105 to a specified thickness using the lapping wheel, and (8) check the thickness of the rock sample 105 and polish the sample 105 if needed.

In the illustrated implementation, the rock sample 105 has a thickness of about 30 millimeters (mm). The glass slide 115 is about 26 mm×46 mm, but the size of the slide 115 can be changed depending on the needs of the thin section 100. In this implementation, the dye epoxy 110 may be blue in order to, for example, clarify the pores 107. The overall thickness of the geological thin section 100 is about 1200 micro meters (μm). These dimensions are merely examples and other geological thin slices within the scope of the present disclosure may have different dimensions. Further, in the present context, "about" includes other dimensions within 5%.

In an alternative implementation, the geological thin section 100 may not include the cover slip 125. For example, if there is a need to do special kind of chemical analyses using Scanning Electron Microscope (SEM) or electron microprobe, the cover slip 125 may be excluded and the rock sample 105 may be polished.

As illustrated, the rock sample 105 includes pores 107 (that is, voids) between grains 109 of the rock sample 105. There are several factors that can define the rock texture: grain size, shape (sphericity), sorting, roundness (angularity), compaction (grain-to-grain contact) and preferred orientation of the grains 109. Grain size is typically used to divide sediments into different classes, thereby making it easier for geologists to describe sediments accordingly. As shown in Table 1, the Udden-Wentworth grain-size scale describes several sediments. In this table, the following abbreviations are used: Phi is a scale to measure grain size in units of $-\log_2 d$, where d is the grain size in millimeters (mm); vcU is upper very coarse; vcL is lower very coarse; cU is upper coarse; cL is lower coarse; mU is upper medium; mL is lower medium; fU is upper fine; fL is lower fine; vfU is upper very fine; and vfL is lower very fine.

TABLE 1

| Grain Diameter | | | | Wentworth Size Class | |
|---|---|---|---|---|---|
| millimeters | microns | phi | | | |
| 256 | | −8.0 | | Boulder | Gravel |
| 64 | | −6.0 | | Cobble | |
| 4.0 | 4000 | −2.0 | | Pebble | |
| 2.0 | 2000 | −1.0 | | Granule | |
| 1.41 | 1410 | −0.5 | vcU | Very coarse sand | Sand |
| 1.0 | 1000 | 0.0 | vcL | | |
| .71 | 710 | 0.5 | cU | Coarse sand | |
| 0.5 | 500 | 1.0 | cL | | |
| 0.35 | 350 | 1.5 | mU | Medium sand | |
| 0.25 | 250 | 2.0 | mL | | |
| 0.177 | 177 | 2.5 | fU | Fine sand | |
| 0.125 | 125 | 3.0 | fL | | |
| 0.088 | 88 | 3.5 | vfU | Very fine sand | |
| 0.0625 | 62.5 | 4.0 | vfL | | |
| 0.002 | 2.0 | 9.0 | | Silt | Mud |
| | | | | Clay | |

Mean grain size, mode, median grain size, sorting, and skewness (for example, a measure of the asymmetry of the probability distribution of a real-valued random variable about its mean) can be presented in a different ways once the grain size distribution is obtained. Each one of these parameters has a value that can describe an aspect of the texture of the sediments.

Figure 2:
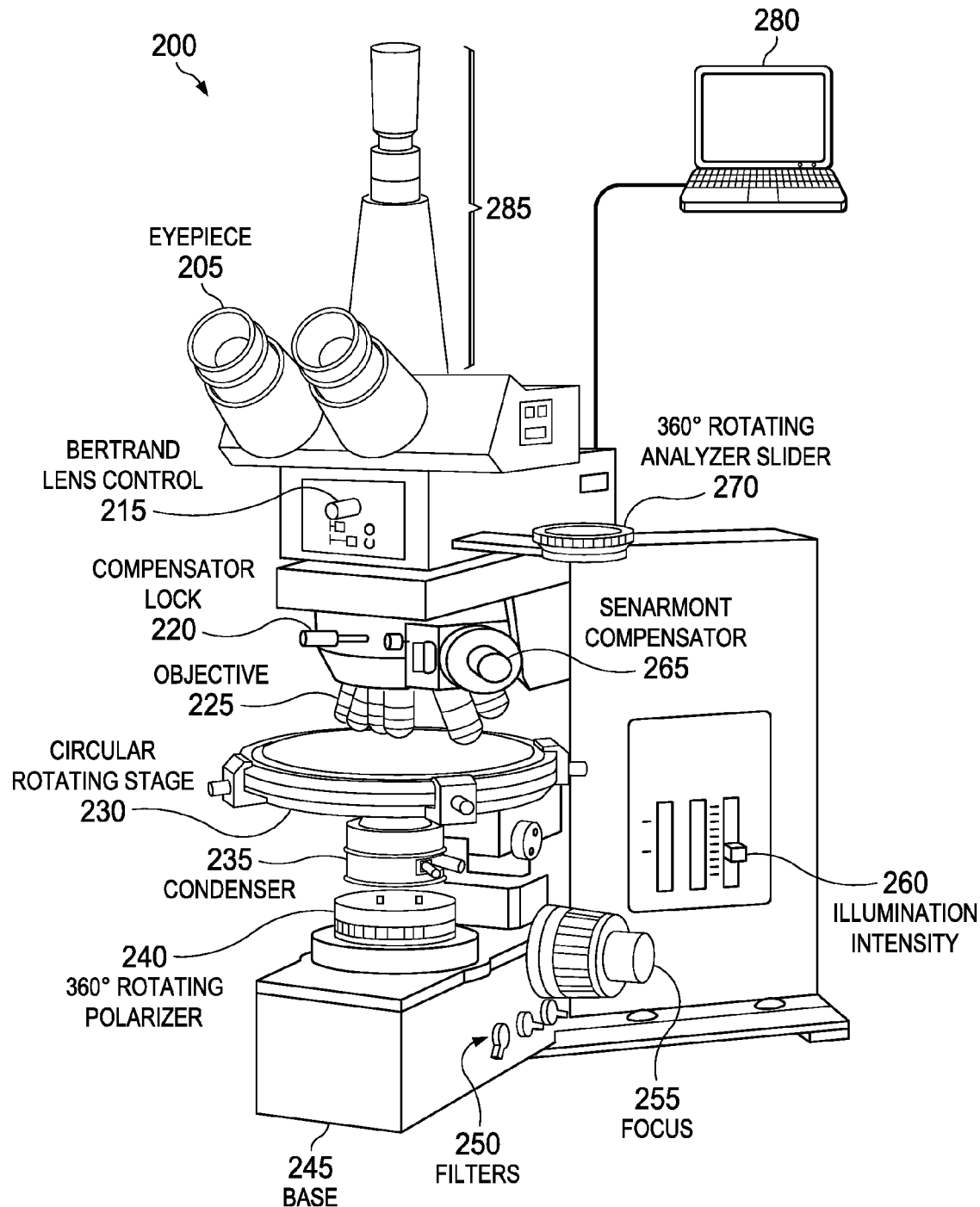
FIG. 2 illustrates an implementation of a polarizing microscope used for an image-based analysis of a geological thin section.

Turning briefly to FIG. 2, an implementation of a polarizing microscope system 200 that may be used for an image-based analysis of the geological thin section 100 is illustrated. Geological thin sections, such as geological thin section 100, can be examined using the polarizing microscope system 200 to examine the grains and pores of the geological thin section 100. The microscope system 200 uses polarized light, because the light waves vibrate in one direction, whereas in normal light, the light waves vibrate in random directions.

The primary components of the polarizing microscope system 200 include: a rotating stage 230, polars 240, a Bertrand lens control 215, a Senarmont compensator 265, a rotating analyzer slider 270, an objective 225 beam-splitter prism, a digital camera system with extension tube 285, and a condenser 235 beam-splitter prism. The rotating stage 230 supports the geological thin section 100 during observation. In this implementation, the rotating stage 230 is a 360-degree circular rotating stage to facilitate view of the geological thin section 100 at different rotational perspectives. The polars 240 include polarizing and analyzing devices or filter and may be placed above and below the rotating stage 230. In this implementation, the polars 240 allow light to pass through in an N-S vibration direction and is placed below the rotating stage 230. The Bertrand lens control 215 allows observation in a conoscopic view where it brings the image of an interference figure into the focal plane of the ocular. The compensator 265 is held in place with a compensator lock 220 and helps determine the order of interference colors between crossed-nicols. The analyzer slider 270 allows light to pass through in E-W vibration direction. It is placed above the rotating stage 230.

Other optical accessories, such as a mica plate, a gypsum plate, and a quartz wedge, and, as are known, may be included in the polarizing microscope system 200. For example, the mica plate gives an interference color of first order white (as understood in optical microscopy). The gypsum plate gives a distinct magenta color at the boundary between first and second order colors. The quartz wedge helps produce interference colors and produce a range of retardations.

The polarizing microscope system 200 shown in FIG. 2 also includes standard components, such as the eyepiece 205, observation tubes 210, and a base 245 that supports the other components. Also included are a number of filters 250 and focus 255 as are known. There is also an illumination intensity control 260.

The polarizing microscope system 200 includes or is communicably coupled to a computing system 280. The computing system 280, in this implementation, is a microprocessor based computing system that includes one or more memory modules, one or more processors, input and output peripherals (including the polarizing microscope as an input), and other associated components. The computing system 280 may also include software in the form of instructions stored on the one or more memory modules and executable by the one or more processors to perform operations, either automatically without human intervention or with human input.

The polarizing microscope system 200 may facilitate viewing and image-capture of the geological thin section 100 in plane-polarized light and cross-polarized light. In plane-polarized light, many minerals are colorless, which makes it impossible to distinguish grain boundaries between two adjacent colorless grains. Similarly, in crossed-polarized light the interference color displayed depends on the mineral type, the orientation of the indicatrix of the grain with respect to the polarizers and the thickness of the thin section 100. Hence, two adjacent grains may have similar interference colors at some orientations of the thin section 100 with respect to the polarizers 240. If sufficient contrast between adjacent grains exists, the boundaries between them can be recognized.

If two adjacent grains in the geological thin section 100 show similar interference colors, the boundaries may be difficult to recognize. As explained more fully infra, the contrast between adjacent grains can be increased by rotating the thin section 100 relative to the polarizer 240 and analyzer 270. Thus, full visual recognition of grain boundaries of the grains of the rock sample 105 in geological thin section 100 can be facilitated by using multiple thin section images taken at different angles of rotation.

Figure 1B:
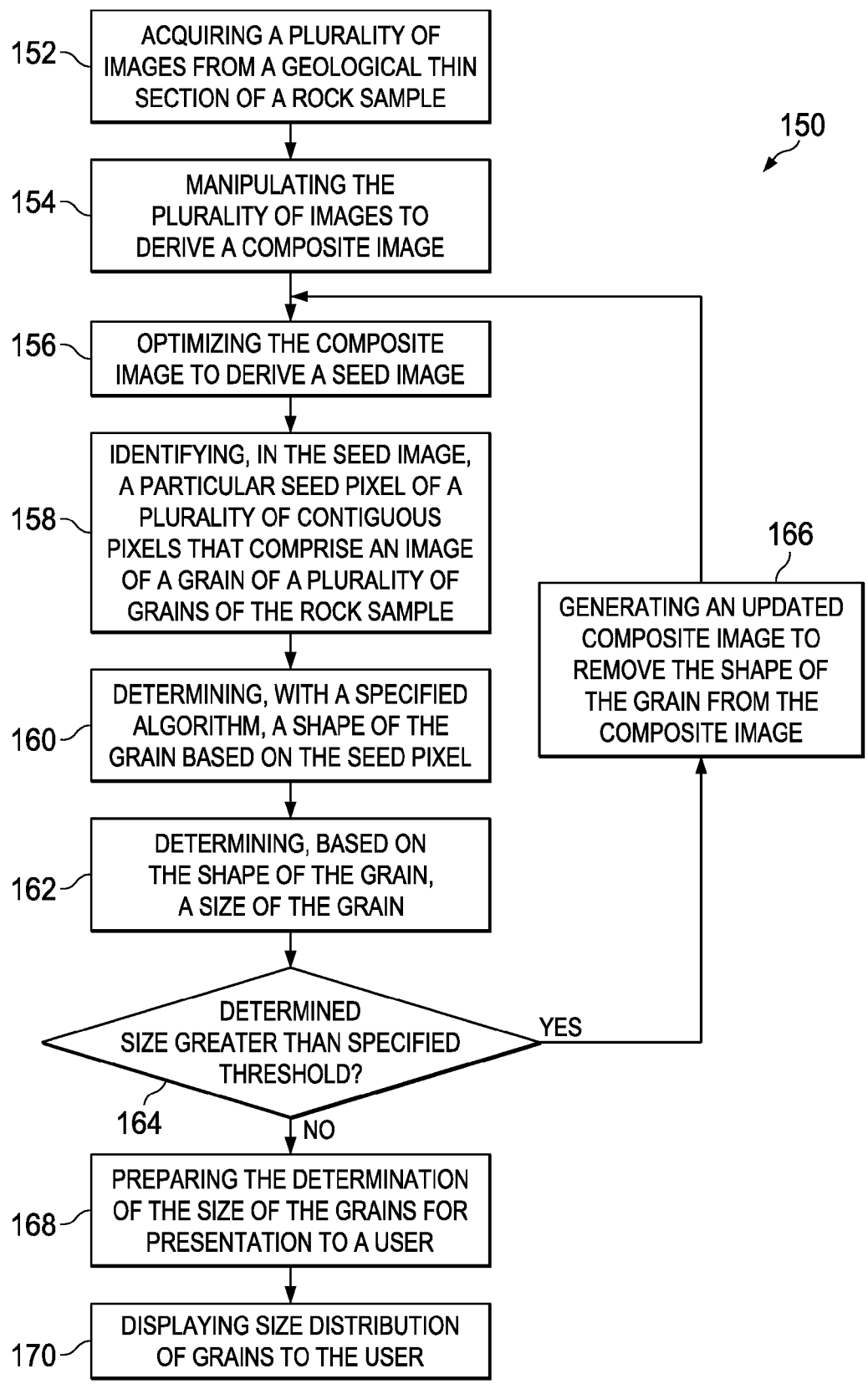
FIG. 1B is a flowchart that describes a method for an image-based analysis of a geological thin section.

Turning back to FIG. 1B, this figure illustrates a flowchart that describes a method 150 for an image-based analysis of a geological thin section. Method 150, for example, may be implemented by the polarizing microscope system 200 in analyzing the geological thin section 100. In some aspects, one or more steps of method 150 may be implemented by or with the computing system 280 of the polarizing microscope system 200, for example, as operations executed by one or more processors.

Method 150 implements a workflow that may maximize an amount of information extracted from the geological thin section 100 by combining optical devices (of the polarizing microscope) and image processing algorithms (implemented in the computing system 280). Method 150 may provide a high level of automation that offers thin section analysis in much less time than can be accomplished with traditional petrographic methods like point counting (for example, tenths of seconds of computation as compared to hours of human manipulations).

Method 150 may, in some aspects, be a fully automated process to analyze the entire geological thin section 100. Method 150 may implement a region growing algorithm for each individual grain shape identification (one grain at the time) of the geological thin section 100. An iterative process on the top of the algorithm may allow for a complete scan of the geological thin section 100. The region growing algorithm is a robust algorithm that could be used for grain shape identification, because, for example, the algorithm shows low sensitivity to "noise" that the geological thin section 100 (and more specifically the grain of the rock sample 105) might contain. "Noise" includes fluid inclusion, cracks, dust, partial dissolution, and other characteristics that tend to blur grain distinctions, such as a visible impurity on the thin section caused by the thin section preparation conditions and image acquisition conditions. For example, noise may include any characteristic of the rock sample 105 that is smaller than a particular size. The particular size may be based on a minimum or lowest expected grain size in the rock sample 105.

The nature and quality of the images described in method 150 provide a contrast between the grains present on the images of the geological thin section 100. Grains in the rock sample 105 must be "visible" to allow the region growing algorithm to detect grain-to-grain interfaces and grain-topore interfaces. For example, a grain in the rock sample 105 is "visible" if there is a sufficient contrast in the grain-to-grain interfaces and the grain-to-pore interfaces (for example, a small value of differential such as 10). In method 150, by using both plane-polarized and cross-polarized light images, a composite image is generated where a sharp contrast is visible in the grain-to-grain interfaces and grain-to-pore interfaces.

Method 150 may further provide for automatic identification of an image pixel location with a high probability of its affiliation to a grain in the geological thin section 100 (and in the rock sample 105). The identified pixel can then be used as a seed point for the region growing algorithm. A seed point, for example, may be a particular pixel within a number of pixels that define a grain from which the region growing algorithm may begin. Method 150 may iteratively implement these features to automate the entire image processing of geological thin section 100 without any human intervention. For example, method 150 generates a probability image, computed from the plane-polarized images as well as from the grains already identified, to implement these features.

Method 150 may also implement one or more growing region criteria to expand the grain region from the seed pixel identified to a final grain shape in the rock sample 105 of the geological thin section 100. In some aspects, method 150 may use a criteria based on the local heterogeneity of the geological thin section 100 to detect the grain-grain interfaces and grain-to-pore interfaces therefor to delimit the grain shape.

FIGS. 3-27 show different images of the geological thin section 100 during the steps of method 150. In this implementation of method 150, the images are converted prior to any processing from color to gray scale. But method 150 may also be implemented with color images (for example, one time per color band: red, green, and blue).

Method 150 may begin at step 152, which includes acquiring a plurality of images from a geological thin section (for example, geological thin section 100) of a rock sample. The plurality of images may be of various types. For example, in one implementation, at least one plane-polarized image of the geological thin section and at least two cross-polarized images of the geological thin section may be acquired (for example, with the polarizing microscope system 200).

In another implementation, four plane-polarized images and four cross-polarized images of the geological thin section 100 may be acquired. In such an implementation, each of the four images (plane-polarized and cross-polarized) may be acquired at a distinct angle relative to a base, or zero, angle (that is, a particular angle relative to a base angle defined as a zero angle). For instance, plane-polarized images may be acquired at 0, 25, 45, and 65° relative to the zero (or base) angle of rotation. Cross-polarized images may also be acquired at 0, 25, 45, and 65° relative to the zero (or base) angle of rotation. Different angles of rotation may also be used in alternative implementations. For instance, sufficiently distinct angles may be chosen to indicate that a first grain is separate or different than a second grain, even if such grains are physically merged or fused together. Choosing angles in such a fashion may mitigate errors that occur because the geological thin section is a two-dimensional representation of a three-dimensional object.

Images from different rotation angles as described previously may be acquired with multiple techniques. For example, the analyzer and polarizer of the polarizing microscope system 200 may be rotated together relative to the geological thin section 100 on a fixed microscope stage. In this way, each point is registered to the same pixel in the image at all positions of the polarizer/analyzer. The overlay of multiple thin section images can then be performed directly (without applying for image registration as described infra), simplifying computational requirements and minimizing numerical approximations. As another example, the geological thin section 100 may be rotated relative to a fixed polarizer and analyzer of the polarizing microscope system 200. In order to perform the overlay of multiple images, an image registration step may be needed (as described infra) to in-rotate the images from the different rotation positions.

Figure 3:
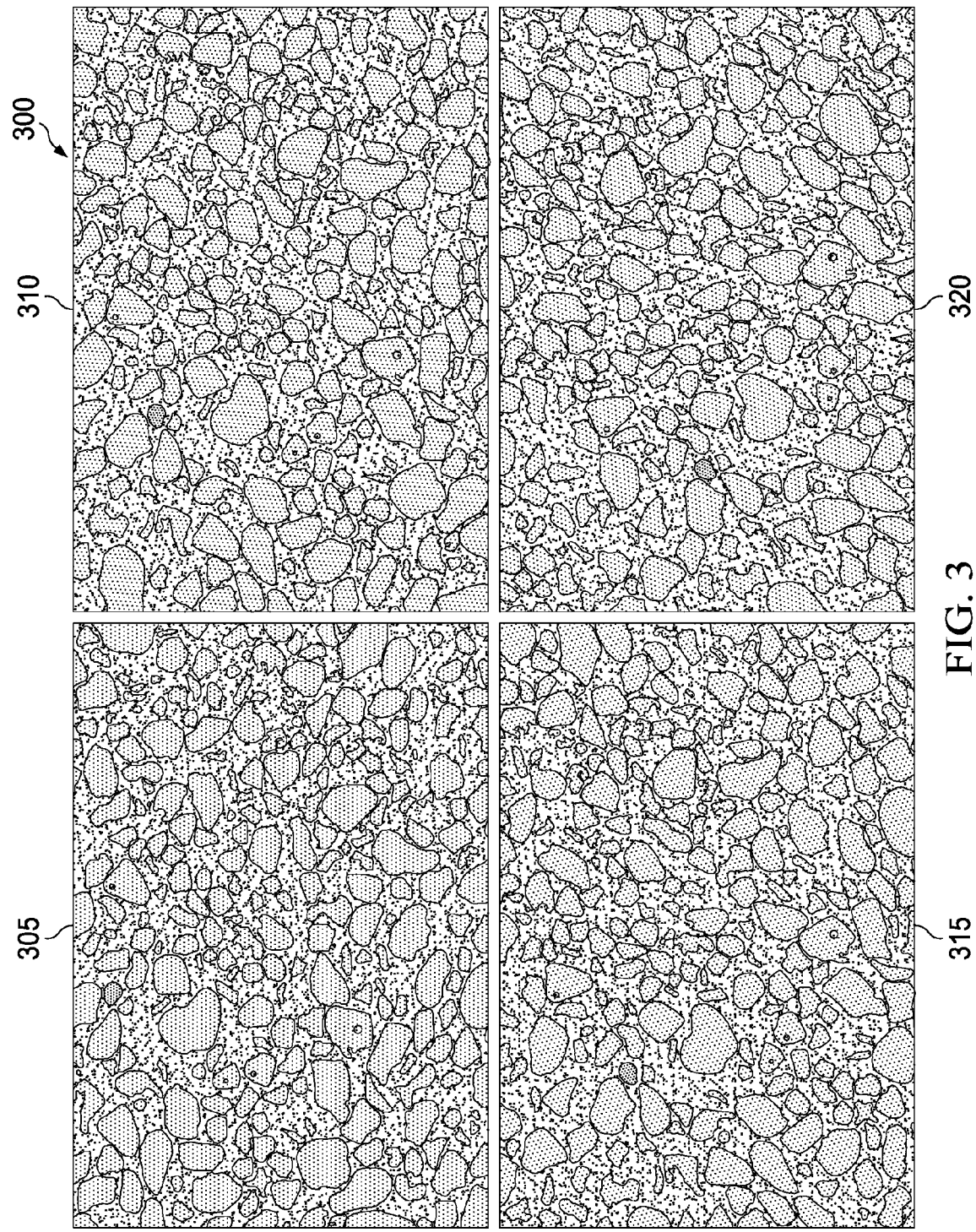
FIG. 3 illustrates plane-polarized images of a geological thin section.
Figure 4:
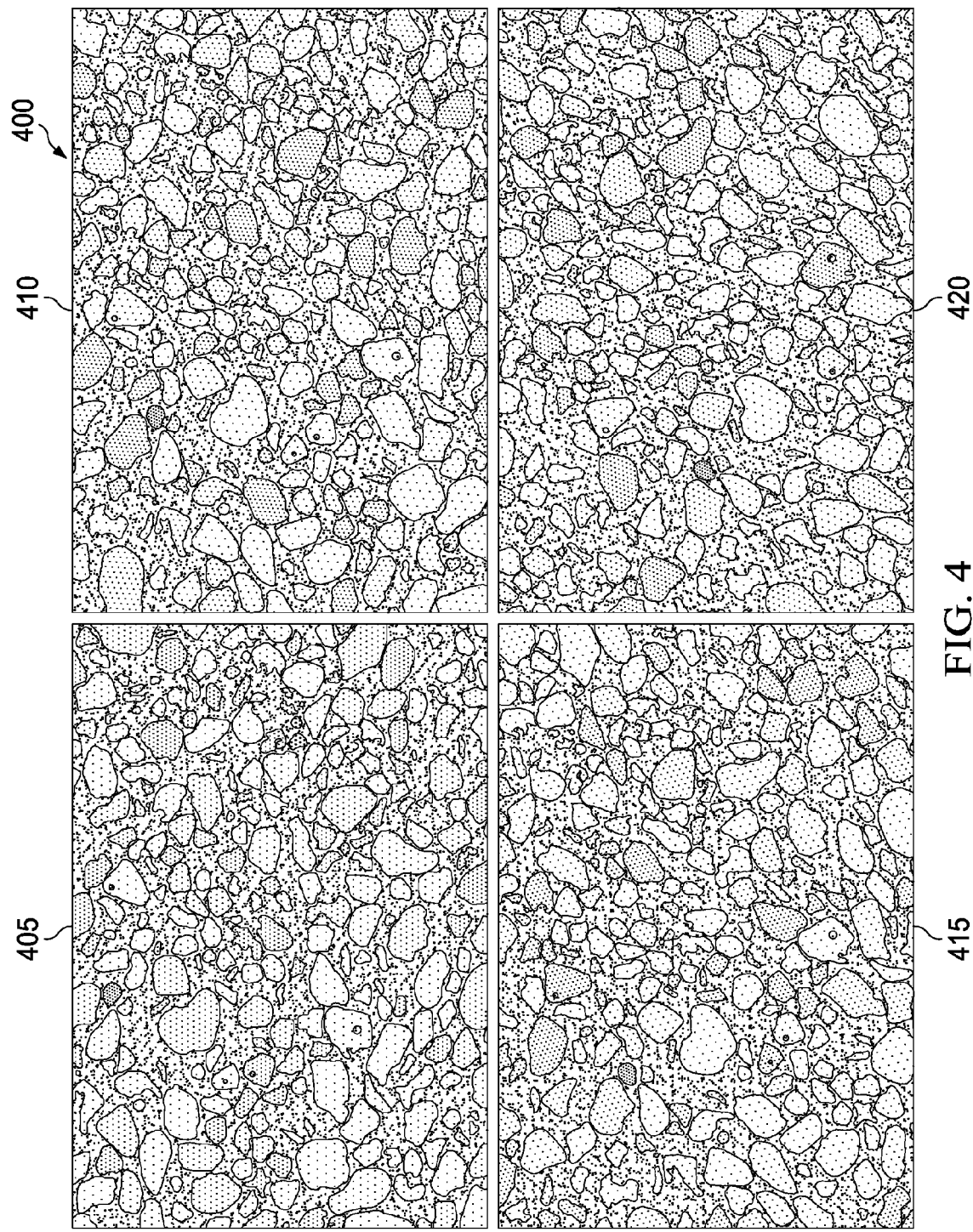
FIG. 4 illustrates cross-polarized images of the geological thin section.

Associated with step 152, FIG. 3 illustrates plane-polarized images 305, 310, 315, and 320 of the geological thin section 100. FIG. 4 illustrates cross-polarized images 405, 410, 415, and 420 of the geological thin section 100. Images 305 and 405 are acquired at a 0 relative angle, images 310 and 410 are acquired at a 25° relative angle, images 315 and 415 are acquired at a 45° relative angle, and images 320 and 420 are acquired at a 65° relative angle. In some aspects, the choice of angles may be based on, for example, a maximum difference in image colors between images taken at the several, distinct angles. The maximum difference may be based on an angle of reflection between the anisotropy axis of the grain and the light propagation axis.

Method 150 may continue at step 154, which includes manipulating the plurality of images to derive a composite image (for example, by a computing system of the polarizing microscope). In some aspects, manipulating the images may include registering the plurality of images. For example, as described previously, depending on the rotational technique used, image registration may be needed. Registering the images includes applying a rotational transformation to each of the plurality of images that is opposite of the rotation applied to the images in step 152 described previously.

In some aspects, a rotational center (for example, the exact rotational center) of each image is determined in the registration process prior to applying the rotational transformation. The exact rotational center is the center of the field of view of each respective image (for example, the four plane-polarized and four cross-polarized images) but may not coincide with an image center. In some aspects, ensuring that the exact rotational centers of each image coincide includes ensuring that an optical camera (camera 285) of the polarizing microscope system 200 is mounted such that the optical axis of the camera 285 is perpendicular to the stage 230. By determining the exact rotational center prior to rotational transformation of the images, several problems may be avoided. For example, overlaying images that are not optimally registered may result in a fuzzy composite image unsuitable for accurate grain and pore recognition.

In some aspects, a numerical algorithm may be executed to obtain the exact center of the rotation.

An implementation of an expression for rotational transformation to register an image is:

$$\begin{cases} \text{new\_image}[i_{new}, j_{new}] = \text{old\_image}[i_{old}, j_{old}] \\ i_{new} = (i_{old} - i_{center})\cos\theta - (j_{old} - j_{center})\sin\theta + i_{old} \\ j_{new} = (i_{old} - i_{center})\sin\theta + (j_{old} - j_{center})\cos\theta + j_{old} \end{cases} \quad \text{Eq. 1}$$

The rotational angle, $\Theta$, is equal to the opposite value of the angle used in step 152 for image acquisition of, for example, the four plane-polarized images and the four cross-polarized images (for example, 0, 25, 45, and 65°).

The center of the rotation (i_center, j_center) is the center of the field of view (the center of the acquired image). If the optical camera 285 is mounted in a way that its optical axis is not perpendicular to the microscope stage, the rotation center does not coincide with the image center but may be close to the image center.

Figure 5:
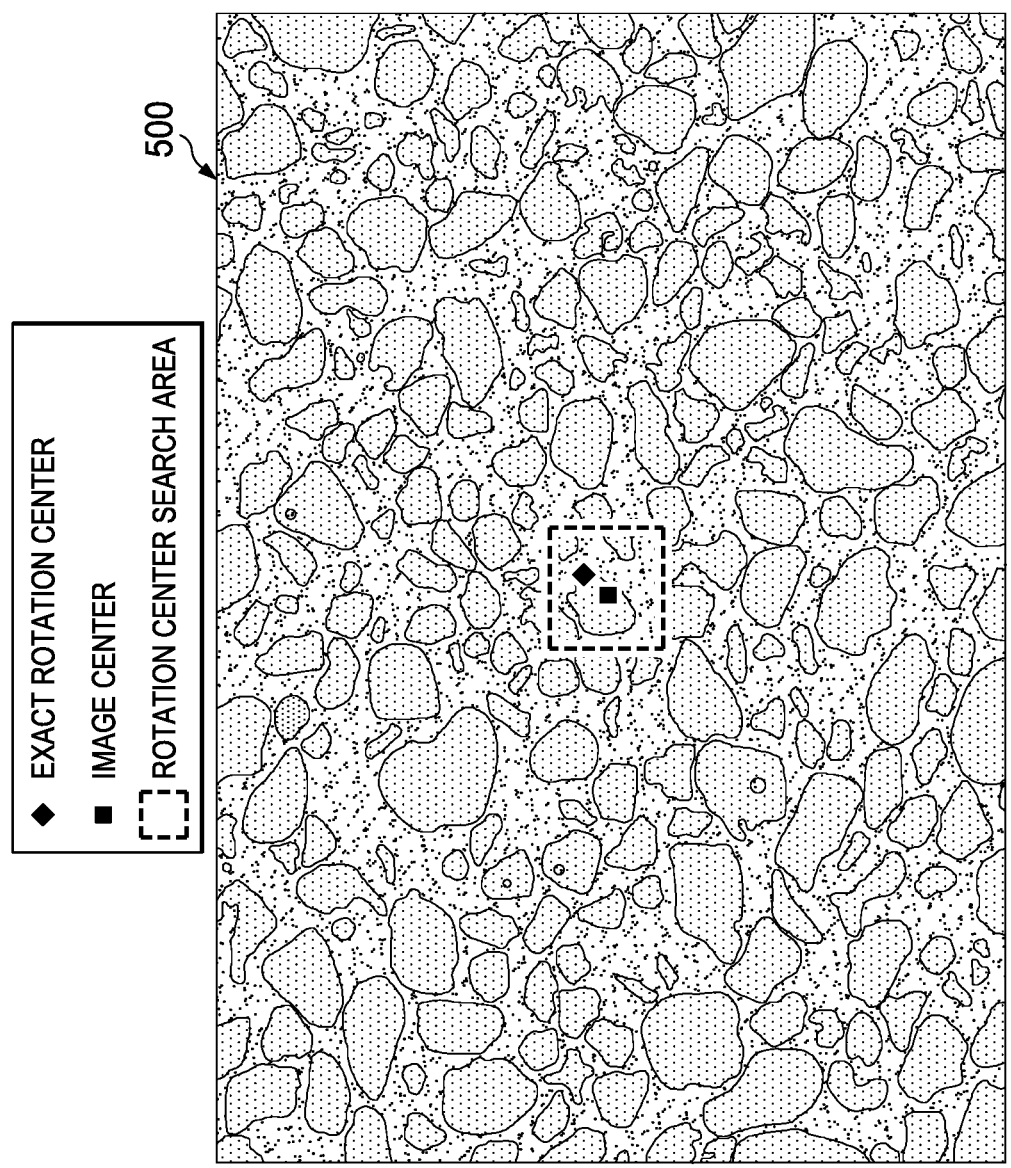
FIG. 5 illustrates a registered image of the geological thin section.

FIG. 5 illustrates an example registered image 500 of one of the plane-polarized images. In this image 500, a red square illustrates a neighborhood of the image center. Further, as shown, the rotational center does not coincide with the image center. An "optimal" rotation center is the center that provides the minimum difference between the two images: the reference and the registered. Numerically, for a given rotation center (i_center, j_center) an objective function is computed to measure the mismatch between each of the registered images (four in this example) and the reference image.

The objective function, in this implementation, is:

$$J(i_{center}, j_{center}) = \Sigma_{\theta \in \{0, 25, 45, 65\}} \|\text{registered\_image} - \text{reference\_image}\|^2 \quad \text{Eq. 2}$$

This objective function is evaluated for the rotation centers located in the neighborhood of the image center (the red square in image 500). Indeed, the image center is the exact solution for this minimization problem if the camera optical axis is perpendicular to the microscope stage 230.

In the case of an isotropic rock sample 105, after registration, a plane-polarized image is (or should be) identical to the reference image (0 degree rotation of the stage). In the case of anisotropic rock samples, such images may not be identical. However, in the case of clastic reservoirs, the isotropy assumption can be accepted and only small differences should be observed between plane-polarized images from different stage rotation angles.

Manipulating the plurality of images to derive a composite image may include generating multiple composite images. For example, a first composite image may be generated by applying an edge detection algorithm to the plane-polarized registered image and the cross-polarized images (shown in FIG. 4). In this implementation, a Sobel edge detection algorithm is implemented but other edge detection algorithms (for example, Canny, Prewitt, or Roberts) are available. In some aspects, a cutoff value may be set to segment the edge image and to identify image pixels that belong to grain edges.

Figure 11:
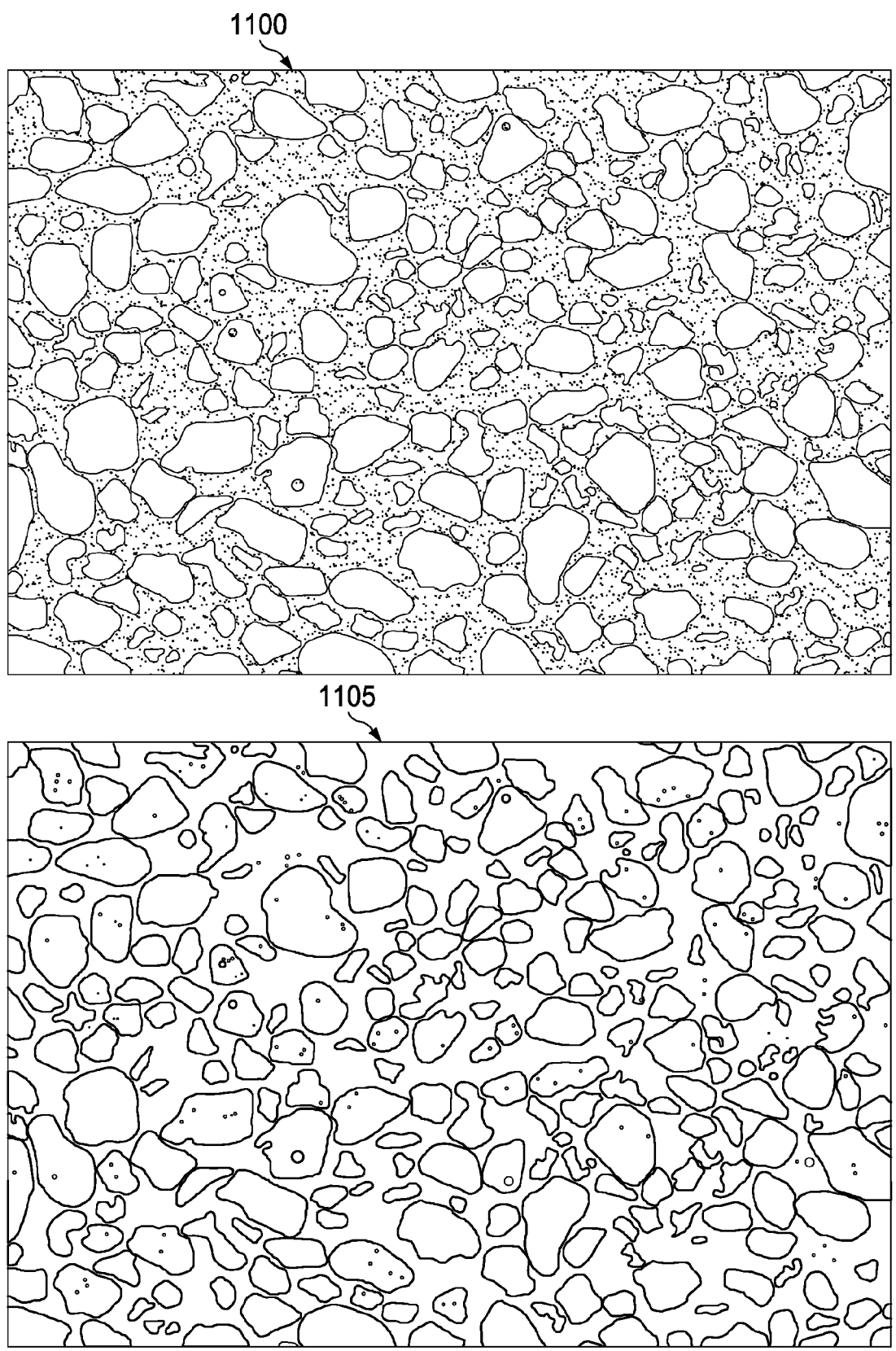
FIG. 11 illustrates plane-polarized images with corresponding edges of the geological thin section.
Figure 12:
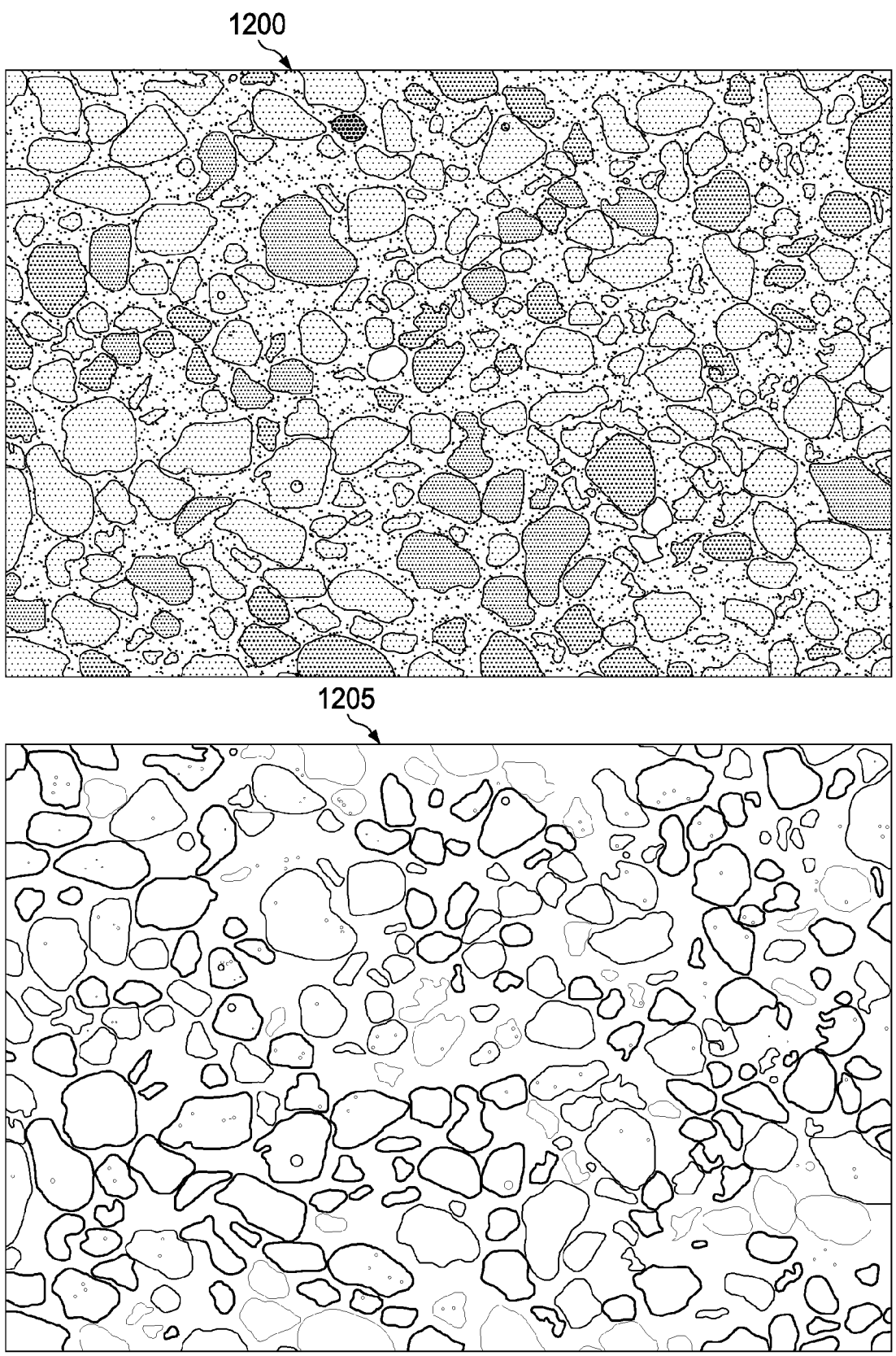
FIGS. 12-15 illustrate cross-polarized images with corresponding edges at different rotations of the geological thin section.
Figure 13:
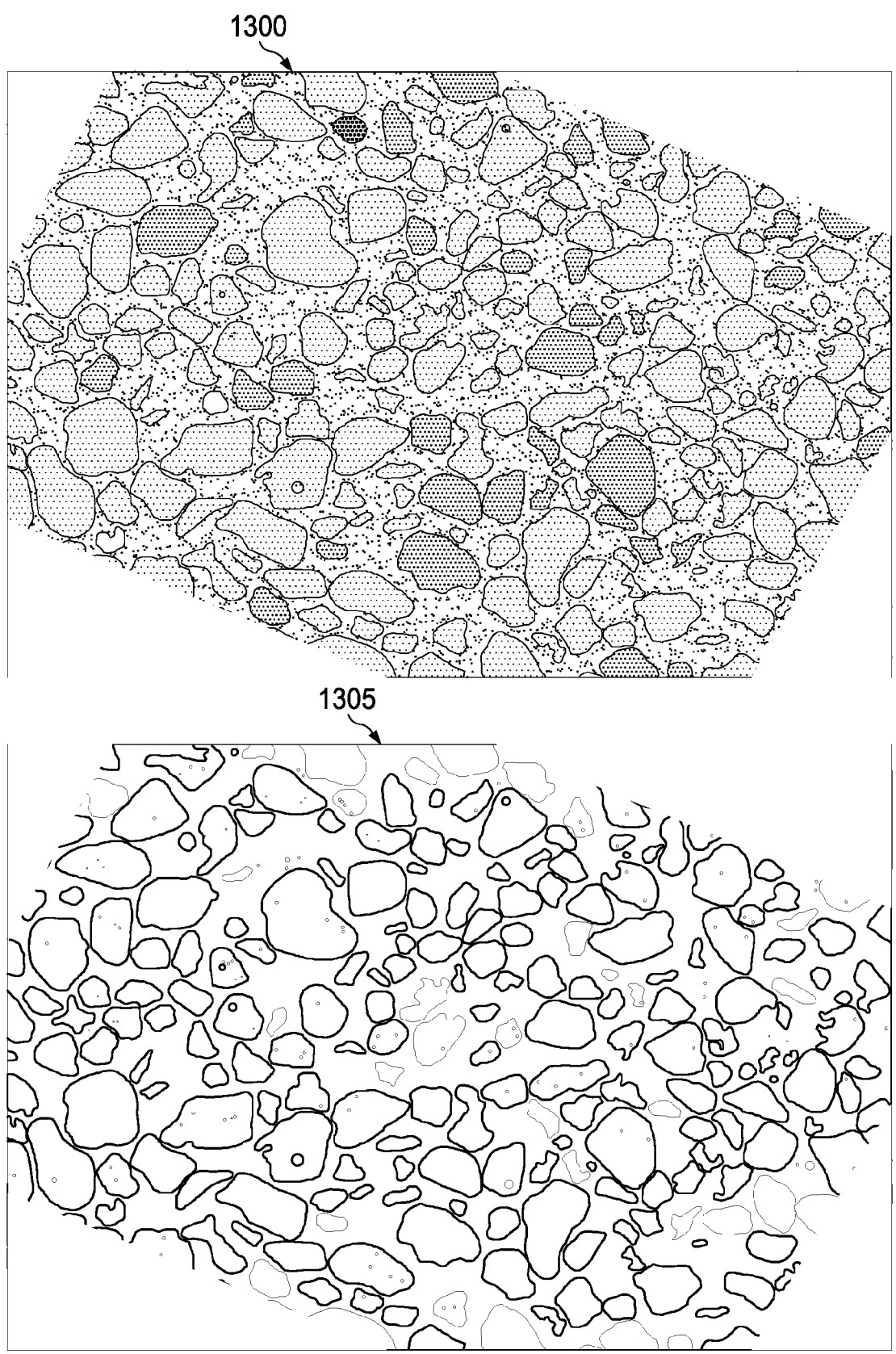
Figure 14:
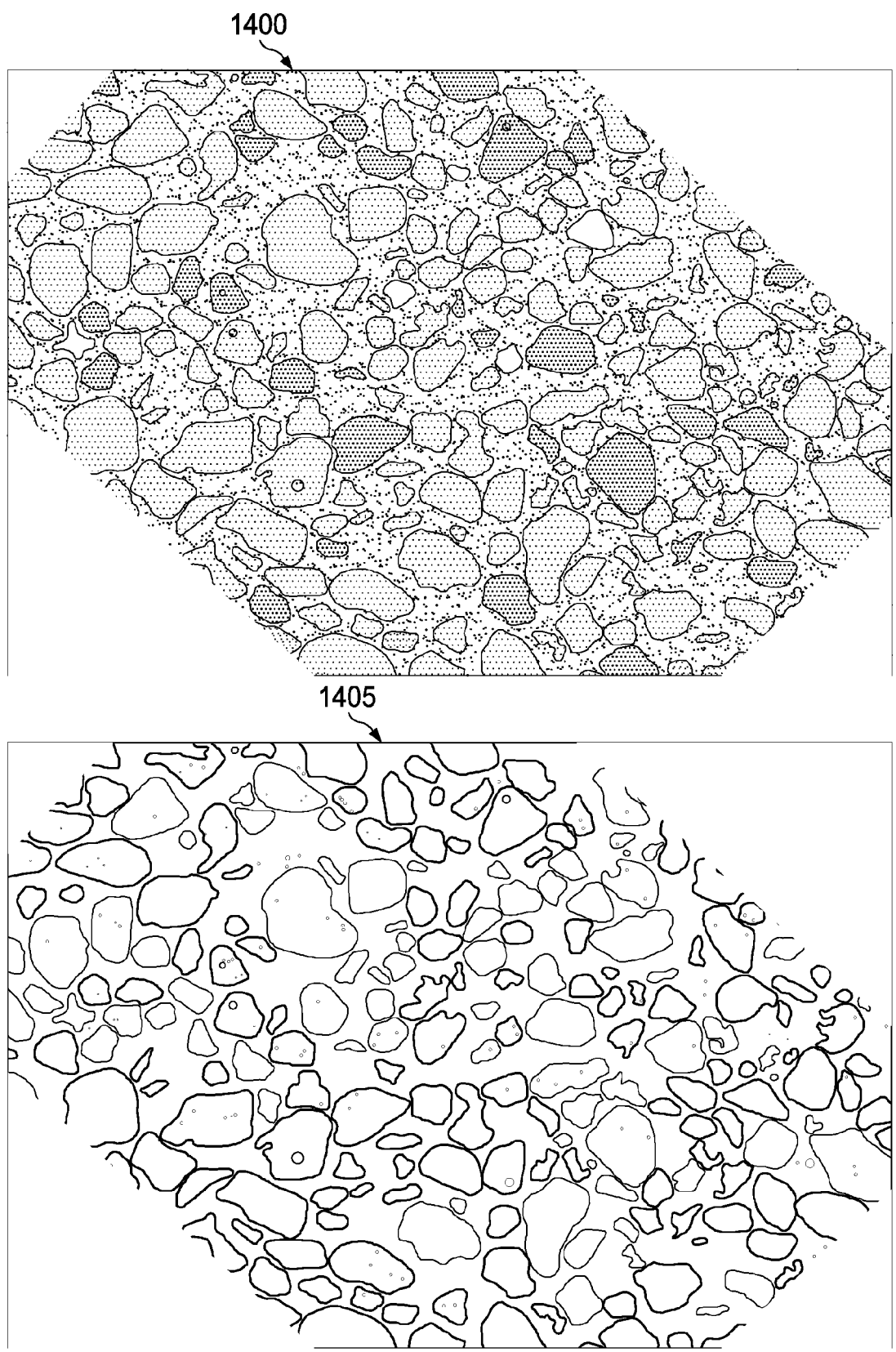
Figure 15:
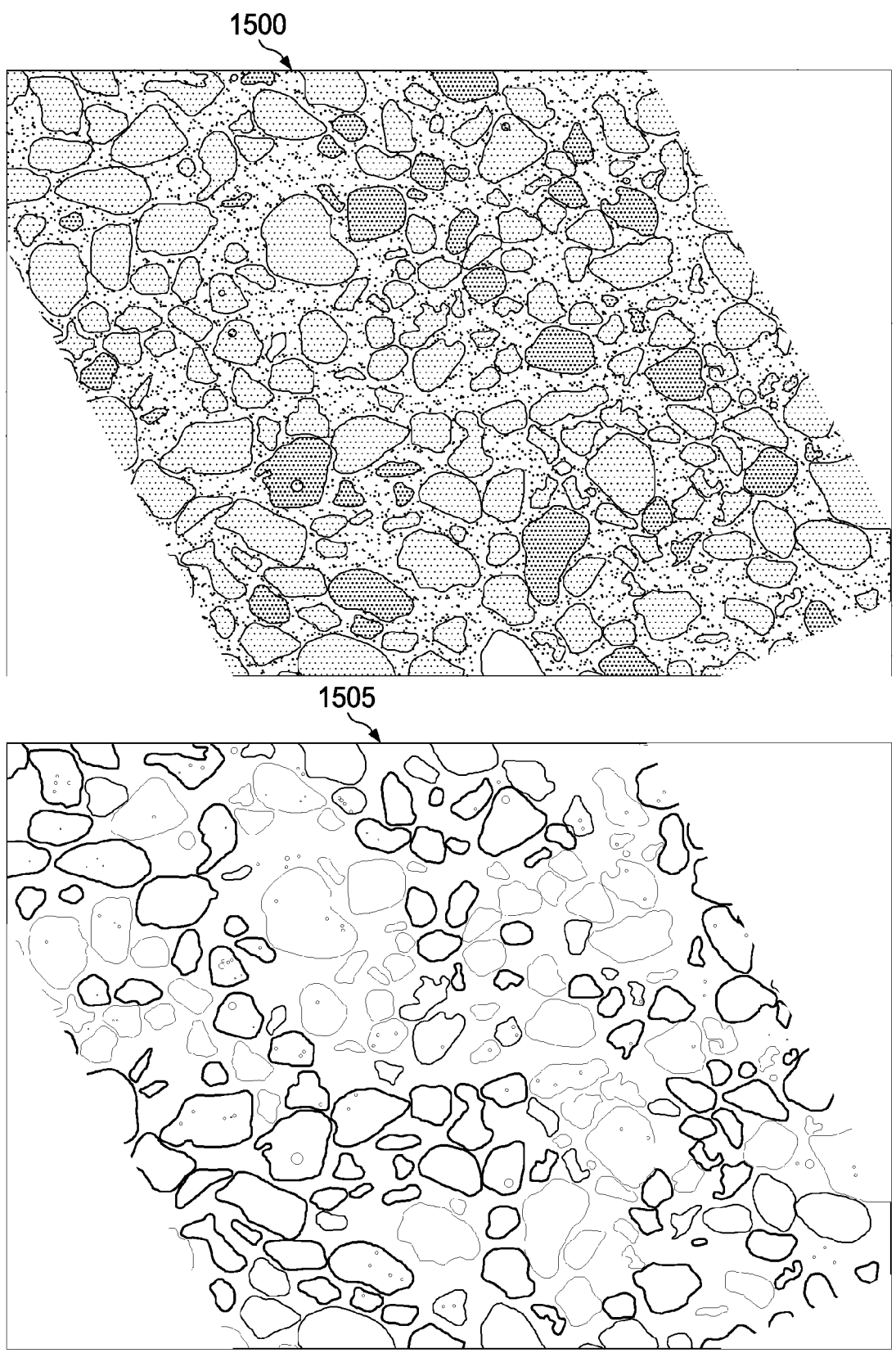

The first composite images that are generated by the edge detection algorithm are shown in FIGS. 11-15. FIG. 11 illustrates the registered plane-polarized image prior to edge detection (in 1100) and after edge detection (in 1105). FIG. 12 illustrates the cross-polarized image (at 0° rotation) prior to edge detection (in 1200) and after edge detection (in 1205). FIG. 13 illustrates the cross-polarized image (at 25° rotation) prior to edge detection (in 1300) and after edge detection (in 1305). FIG. 14 illustrates the cross-polarized image (at 45° rotation) prior to edge detection (in 1400) and after edge detection (in 1405). FIG. 15 illustrates the cross-polarized image (at 65° rotation) prior to edge detection (in 1500) and after edge detection (in 1505).

Figure 16:
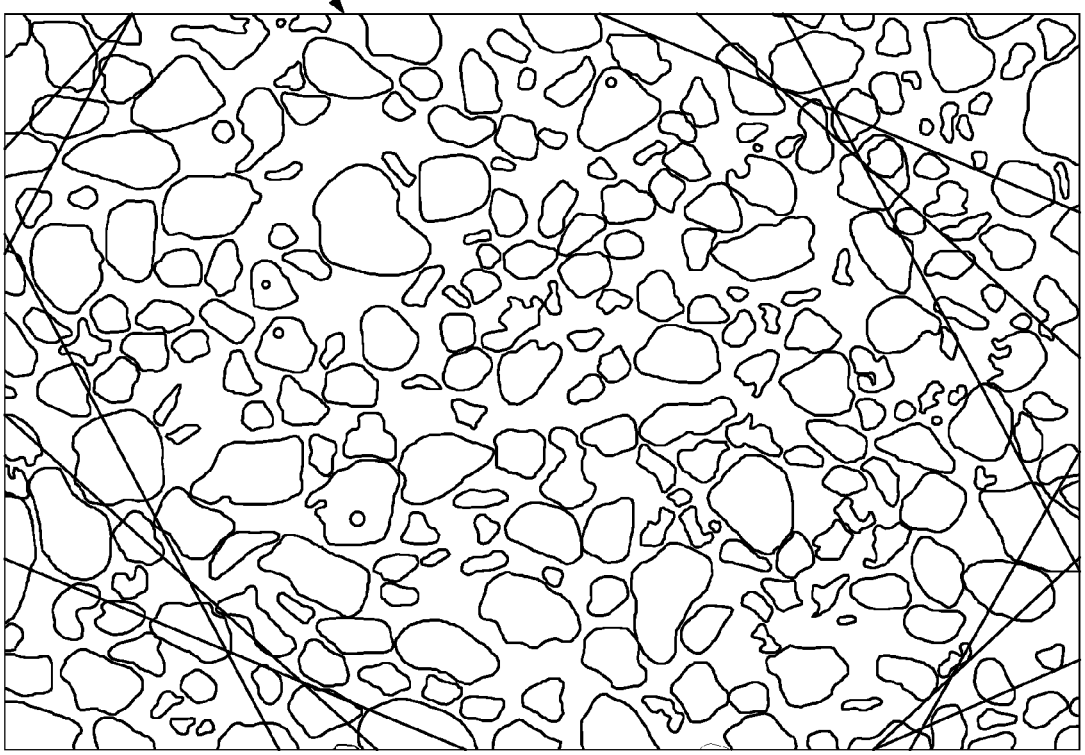
FIG. 16 illustrates an aggregated edge image of the geological thin section.

Once the different first composite images are generated by the edge detection algorithm, an aggregated edge image may be formed as shown in FIG. 16. Image 1600 of FIG. 16 illustrates a final edge image built with the edge images of FIGS. 11-15 described previously. In an example aspect of the aggregated edge image, a unique and final edge image is built by considering each pixel in this final image 1600 as an edge of a grain in the geological thin section 100 if the pixel is representing an edge of the grain in at least one of the five edge images (images 1100, 1200, 1300, 1400, and 1500).

Figure 6:
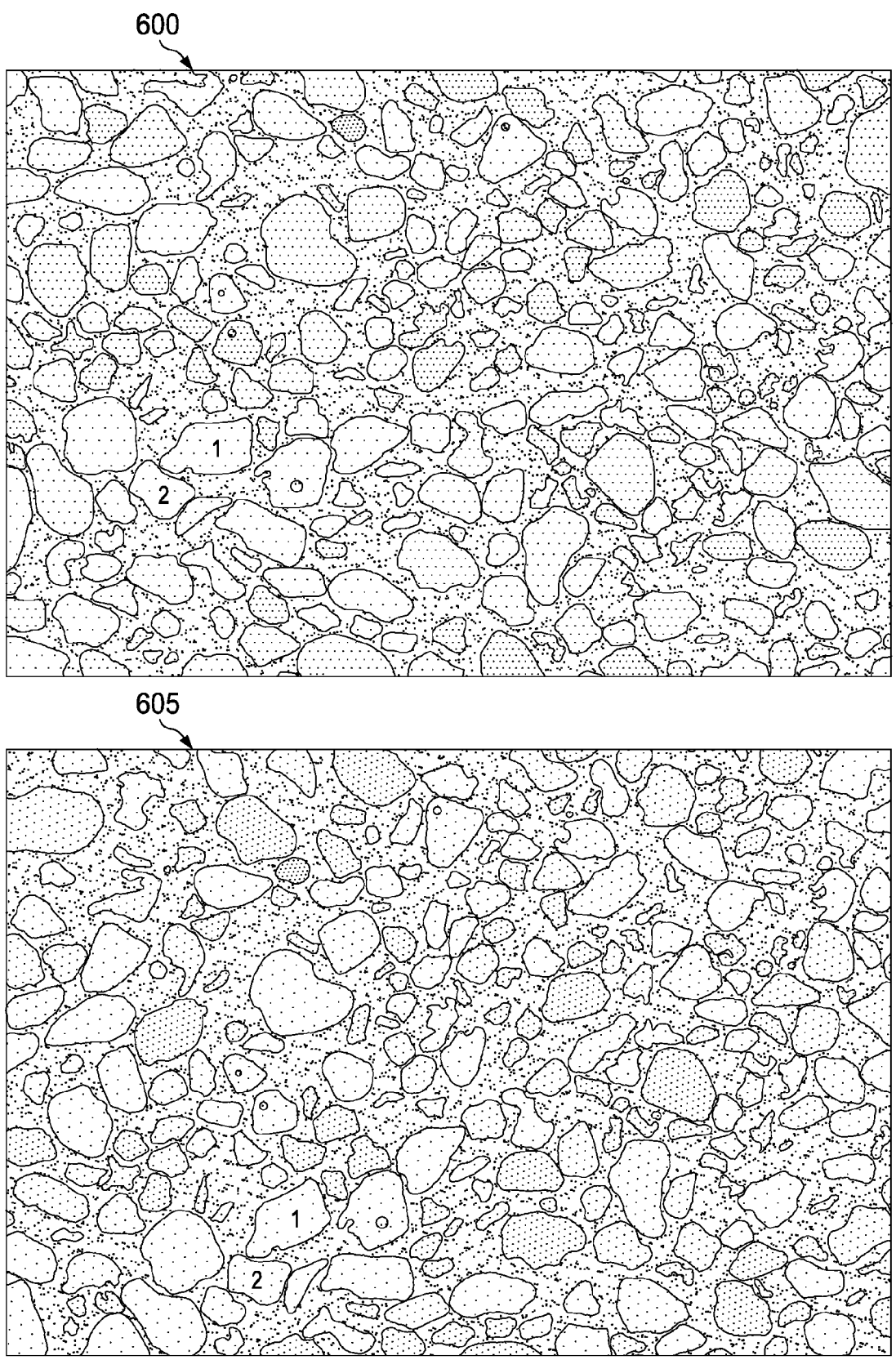
FIG. 6 illustrates rotated cross-polarized images of the geological thin section.

A second composite image may be formed from the first composite images generated with the edge detection algorithm. In this implementation of method 150, the cross-polarized images may form the basis of the region growing algorithm. In the original cross polarized images (shown in FIG. 4), however, there may be little or no contrast between adjacent grains. With little to no contrast, a region growing algorithm may not successfully determine real grain shapes. For example, FIG. 6 illustrates rotated cross-polarized images 600 and 605 of the geological thin section 100. The image 600 shows the cross-polarized image of the geological thin section 100 at 0° rotation, while the image 605 shows the cross-polarized image of the geological thin section 100 at 25° rotation. As illustrated, grains labeled "1" and "2" in image 600 show a case where the region growing algorithm may fail to discriminate the two grains because of the lack of contrast. In image 605, the contrast between these two grains "1" and "2" is more pronounced, which may enhance the chance that region growing algorithm can discriminate the grain shapes.

Figure 7:
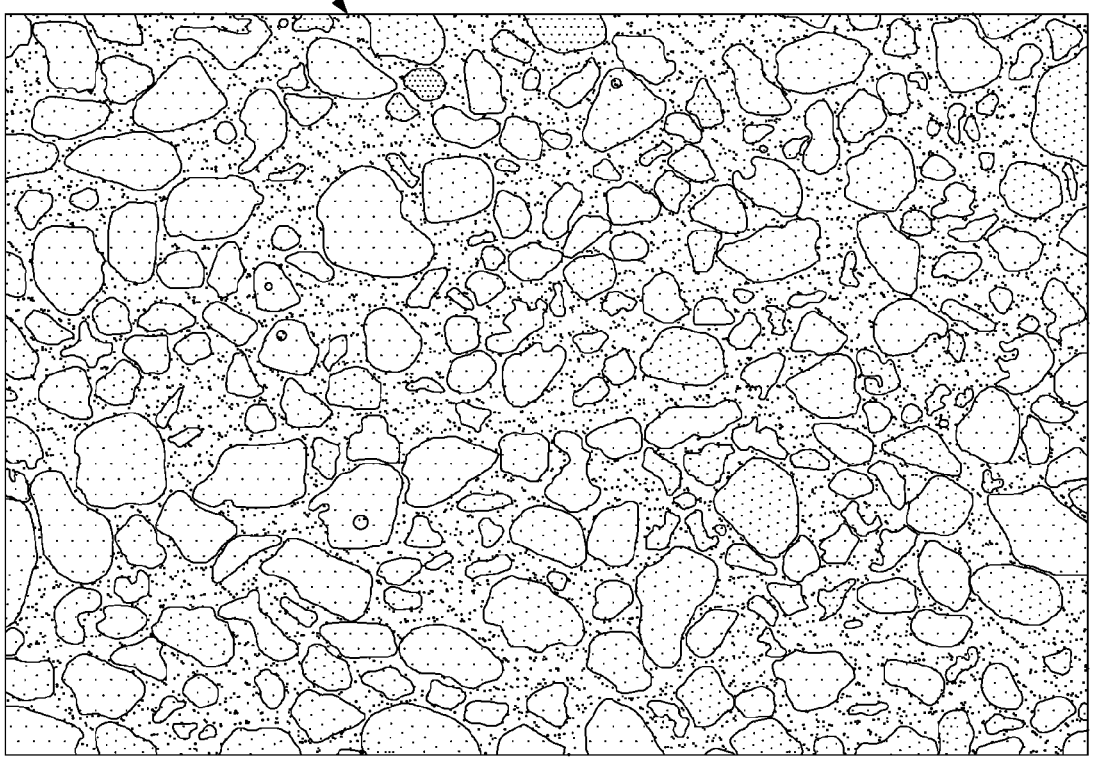
FIG. 7 illustrates a composite image of the geological thin section.

In order to generate the second composite image, a combined image of the cross-polarized images (shown in FIG. 4) is formed. FIG. 7 illustrates a second composite image 700 of the geological thin section 100, in which the cross-polarized images are combined by averaging the four cross-polarized images 405, 410, 415, and 420. For example, combining information from the available cross-polarized images and using the result as the input image for the region growing may enhance a contrast between the maximum numbers of grains 109 in the rock sample 105 of the geological thin section 100. The number of images to be "combined" as well as the respective angle of acquisition could be different than described herein.

In an aspect of method 150, space of the acquisition angles is optimally scanned (for example, scanned with a maximum of difference between grain colors from one image to the next image). Based on the cross-polarized image acquisition being a periodic process with a periodicity angle of 90° (for example, the image acquired at 0° is identical to the image acquired at 90°), the previously described four angles (0, 25, 45, and 65°) were chosen for the rotation of the stage 230 when acquiring the images. The rotation step average (about 22°) may provide for the appearance of substantial changes from images.

A third composite image may also be formed in step 154 by pore space mapping and segmenting the plane-polarized image. In some aspects, the pore space mapping may improve the region growing algorithm implementation by enhancing the grain-pore contrast that can be mapped from the plane-polarized image (image 500 of FIG. 5). For example, in some aspects, a contrast between dark grains and pore space in the image 500 may not be enough for the region growing algorithm to refrain from expanding a determined grain shape into the pore space. Thus, the pore space should be excluded from the region growing space.

Figure 8:
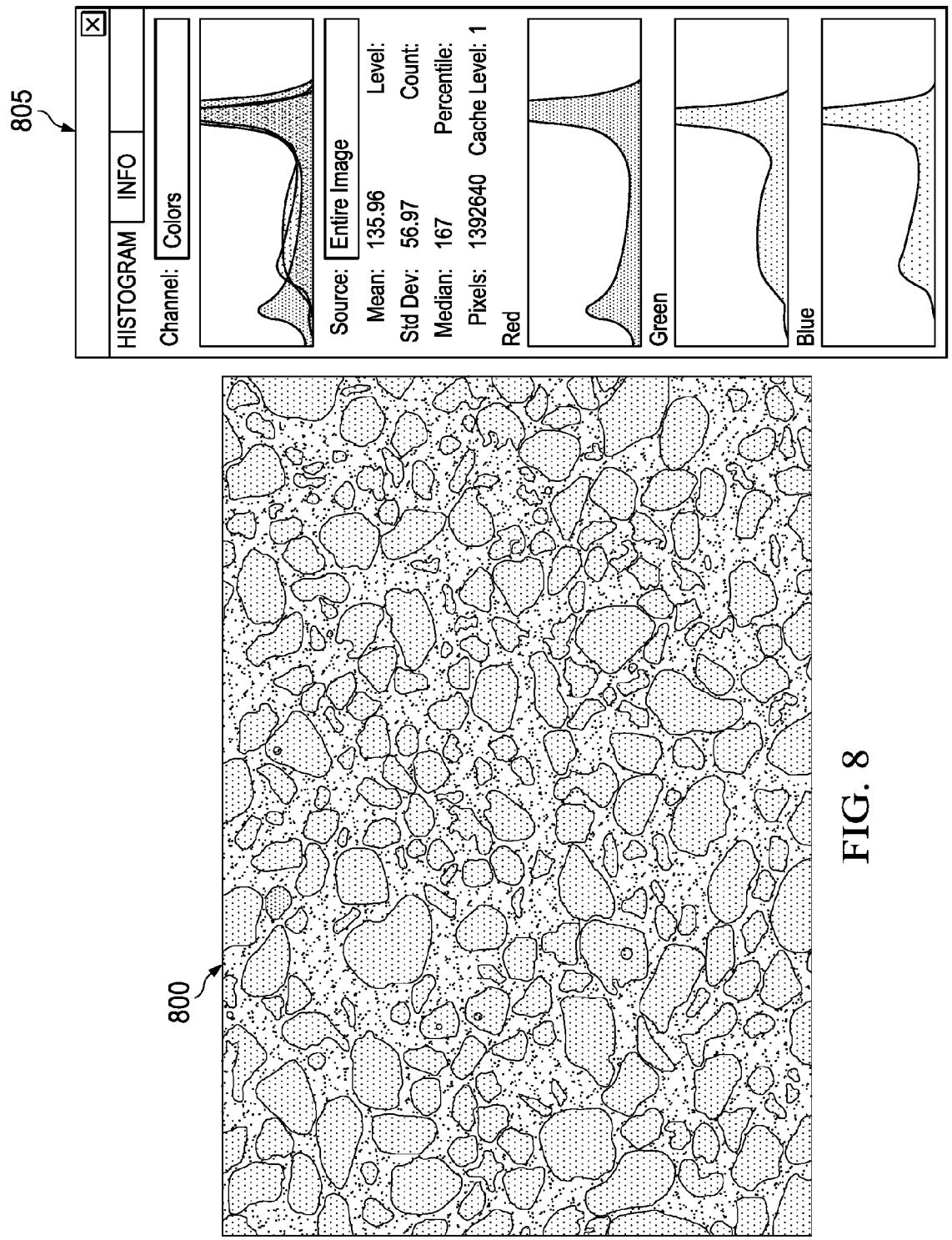
FIG. 8 illustrates another plane polarized image of the geological thin section.
Figure 10:
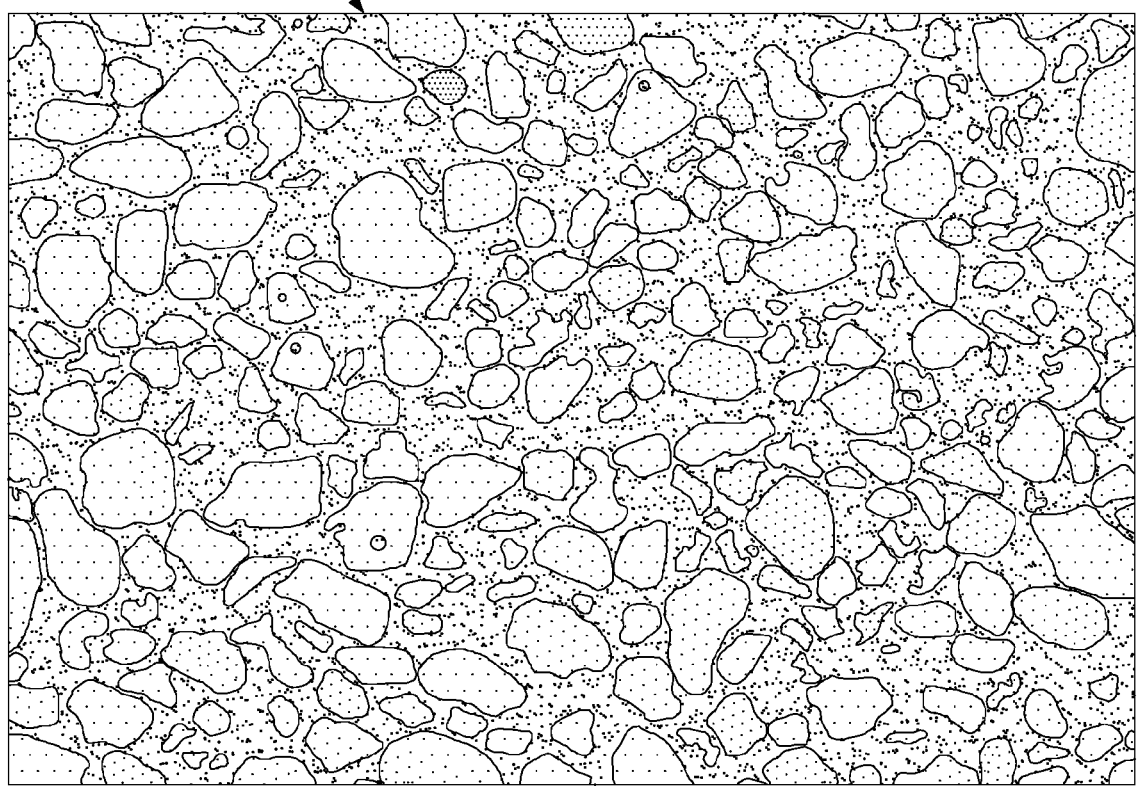
FIG. 10 illustrates a composite image of the geological thin section.

Exclusion of the pore space may best be accomplished by using the plane-polarized image, since a histogram 805 of the plane-polarized image is bimodal as shown in FIG. 8. Indeed, as shown, image 800 shows that a clear cut-off can be determined or calculated to segment this image into a grain color and a pore color. This value can be applied to the plane-polarized image 500 to distinguish grains from pores more easily.

In some aspects of step 154, the cut-off value may depend on a color of the dye epoxy 110 used to prepare the geological thin section 100. For example, the cut-off value can be estimated manually for a particular geological thin section to be analyzed and then used for other geological thin sections to be analyzed, provided that the same epoxy is being used for all of the geological thin sections.

Figure 9:
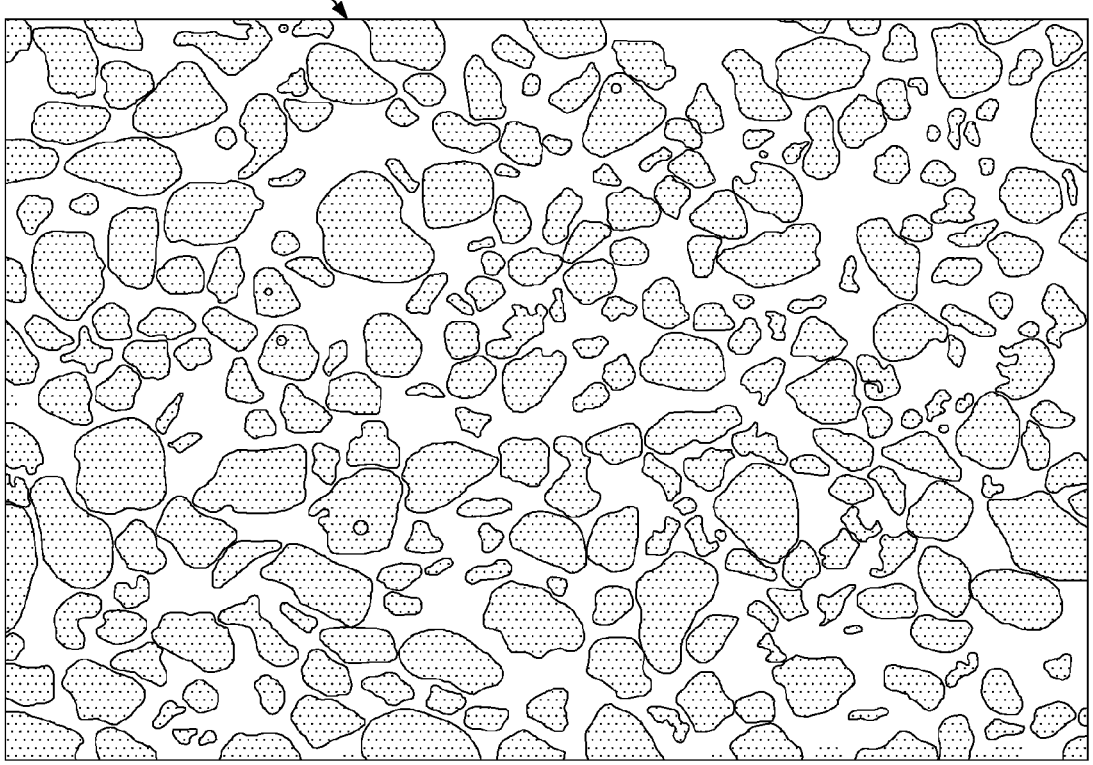
FIG. 9 illustrates a segmented plane-polarized image of the geological thin section.

The plane polarized image may then be segmented as shown in FIG. 9. Image 900 of FIG. 9 illustrates the segmented image, in which white pixels of the image 900 represent pore space not to be used in the region growing algorithm to determine grain shape. From this segmented image 900, the third composite image can be computed by tagging the porous pixels (that is, pixels in image that represent pores and not grains of the rock sample 105) in the second composite image 700 shown in FIG. 7. Tagging of the porous pixels may be done automatically (for example, without human intervention) by a computing system of the polarizing microscope or manually (for example, with human intervention). The third composite image is shown as image 1000 in FIG. 10.

Figure 17:
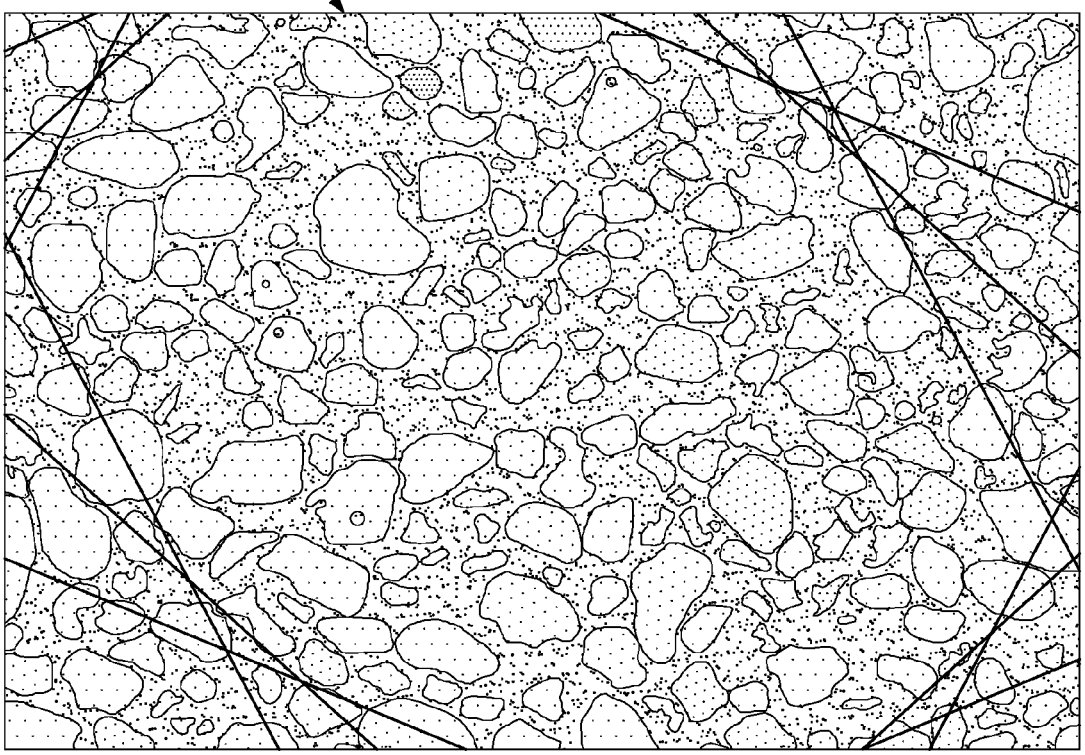
FIG. 17 illustrates a composite image of the geological thin section.

A final composite image may also be formed in step 154 by pore space mapping the plane-polarized image. In one example of generating the final composite image, the final composite image 1700 shown in FIG. 17 is generated by tagging edges that were determined on the aggregated edge image 1600 (shown in FIG. 16) on the image 1000 from FIG. 10. As shown in image 1700, this final composite image appears more suitable than the other acquired images to run the region growing algorithm. More specifically, the grain-pore interface is more clear, as are grain-to-grain interfaces for large number of grains in the geological thin section 100.

Figure 18:
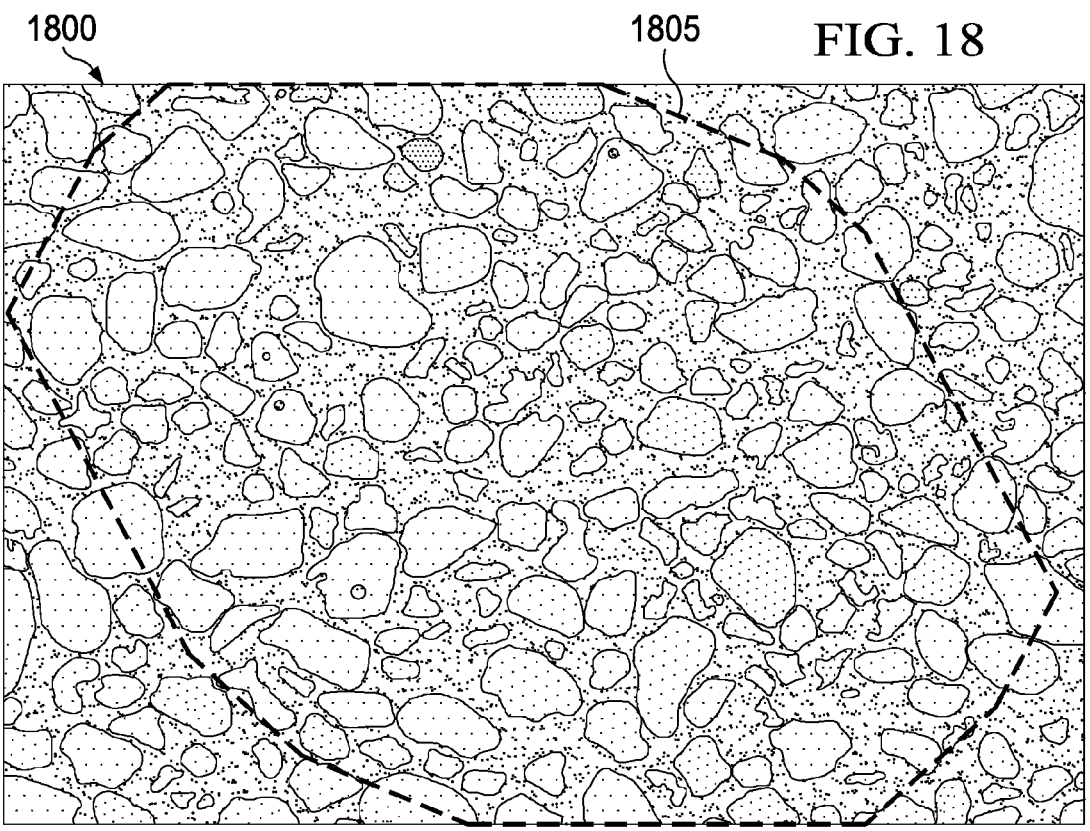
FIG. 18 illustrates an overlaying of registered images of the geological thin section.

Step 154 may also include a determination of a region of interest (ROI) in the final composite image 1700. The ROI may be determined, for example, by overlaying the four registered images (the images that result from the rotational transformation described previously) onto image 1700. The ROI may be determined for the analysis of geological thin section 100. The overlaid image is shown in FIG. 18 as image 1800 with ROI 1805 (shown in dashed line). Numerical lightening contrast appears in the corner of the image derived from overlaying. This numerical lighting (that is, artificial lightening) contrast may lead to incorrect grain shape result for the grains crossed by this contrast.

Method 150 may continue at step 156, which includes optimizing the composite image to derive a seed image. In order to apply the region growing algorithm, a seed point from a seed image is determined. The seed point, or seed pixel, is a point or pixel in an image that is inside of or within a grain in the geological thin section 100. One technique for selecting seed points is by having a user or operator manually (with an input device or otherwise) select the grains for identification by clicking at a point somewhere inside the grain of interest. This technique is accurate since the user is able to provide the seed for the grain for study and can visually avoid selecting a seed pixel close to a noisy area of the grain (for example, an area with fluid inclusion, dissolution, dust, crack, or otherwise) that is not representative of the real grain texture. However, this method requires that all the grains must be chosen manually (for example, using an input device of a computing system) and may be time prohibitive. Indeed, for a single geological thin section, hundreds of grains must be used to provide a reliable statistical analysis of the geological thin section.

Thus, step 156 of method 150 utilizes an automated technique for selecting seed points (or seed pixels) that can be completed without user intervention. An optimal result in terms of grain shape identification (for example, identifying a grain rather than a pore) when using the region growing algorithm may be obtained when the seed point is located in the most homogeneous area within a particular grain. Based on this location, a chance of the region growing algorithm reaching the grain boundary may be very high even in the presence of noisy pixels inside the grain. Step 156, in this implementation, includes an algorithm to determine such a seed pixel by using the plane-polarized image.

Figure 19:
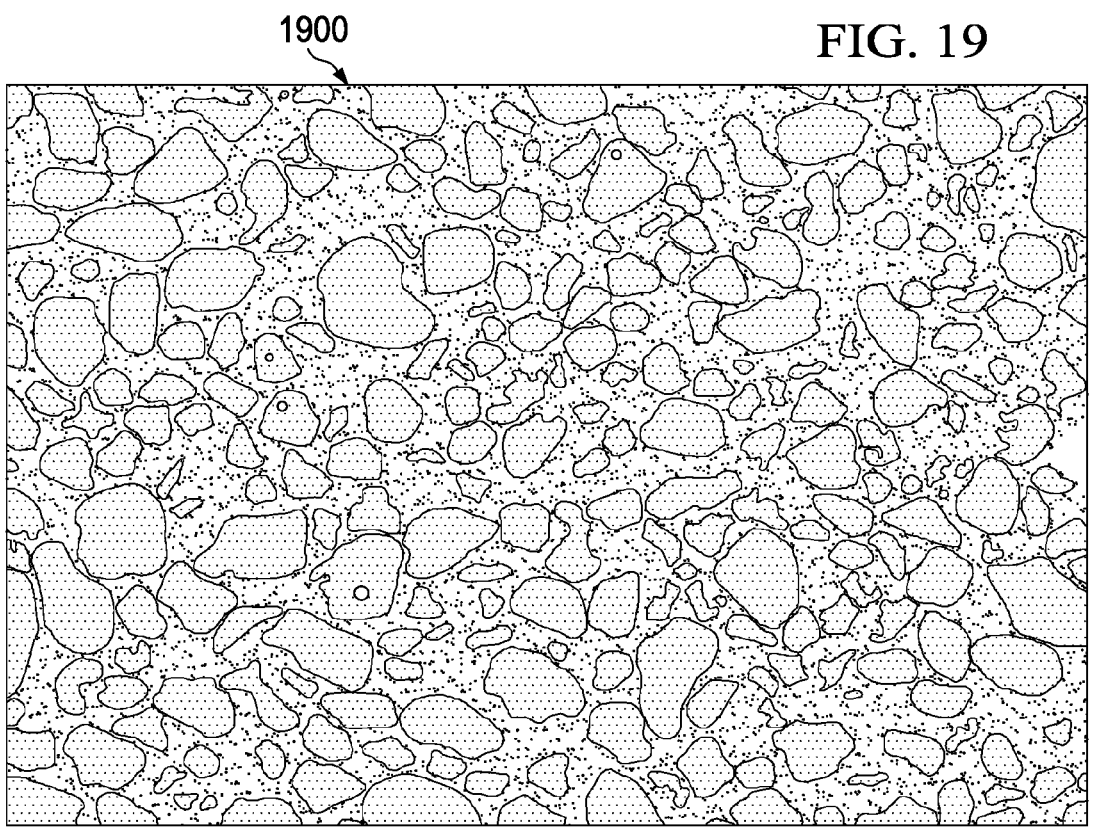
FIG. 19 illustrates an average of plane-polarized images of the geological thin section.

For example, step 156 includes deriving at least one new image from the final composite image 1700. In a specific aspect, two new images are derived from the final composite image 1700. A first seed image may be derived by taking an average of the final composite image 1700. The first seed image is shown in FIG. 19 as image 1900. The image 1900 is computed from the final composite image 1700 using a moving window. In this example, the moving window is a filter applied to compute local statistics of an original image. In one aspect, the window size is 11 pixels by 11 pixels. Changing the moving window size may change the order that the grains are identified and processed but may not change the overall results of the thin section analysis.

Figure 20:
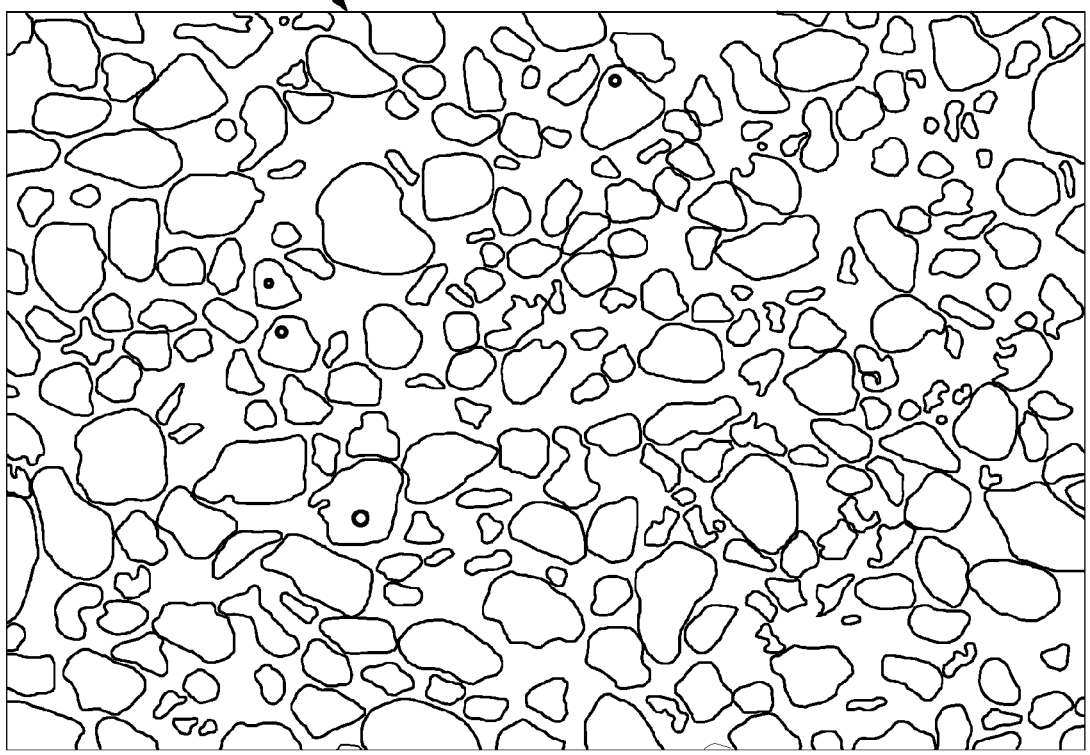
FIG. 20 illustrates a deviation of plane-polarized images of the geological thin section.

A second seed image is also computed and shown in FIG. 20 as image 2000. Image 2000, in this implementation is an absolute or standard deviation of the first seed image 1900. A zone in the geological thin section 100 with high homogeneity is given by pixels in the absolute deviation image with low values, that is, dark pixels. These pixels are located either in grains or in pores of the geological thin section 100. Since grain shape and size are of interest (rather than pore shape and size), the first seed image 1900 can be used to decide on the pixel category (pore or grain).

Figure 21:
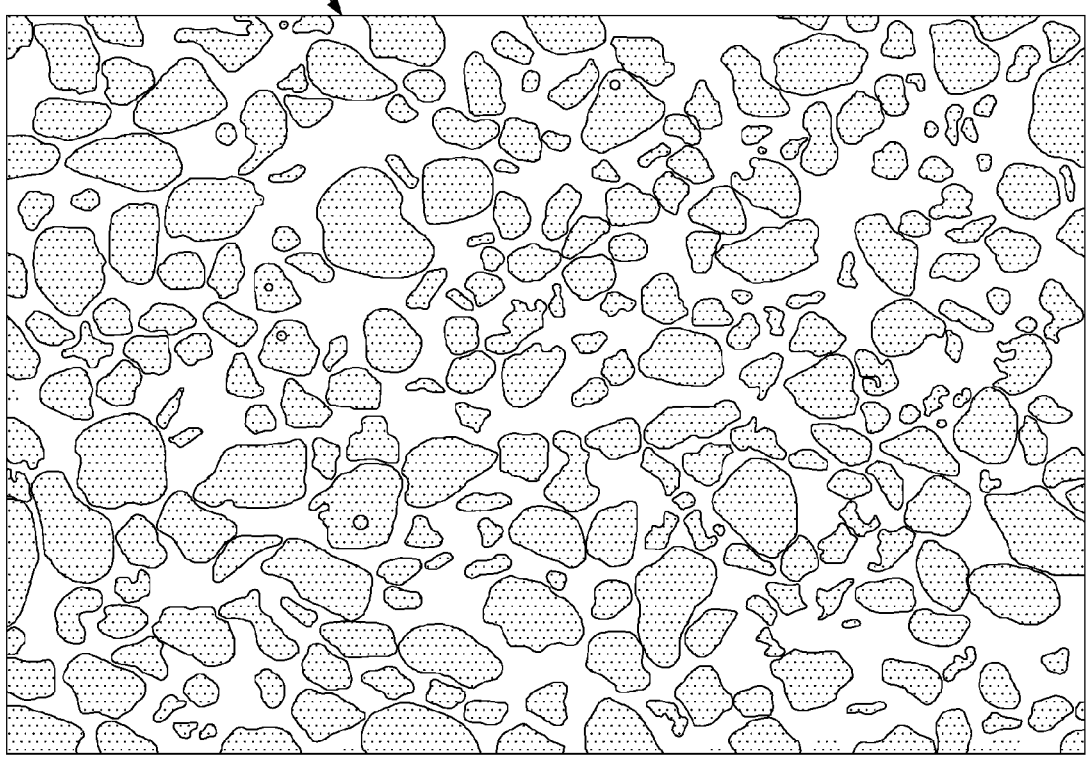
FIG. 21 illustrates a composite image of the geological thin section that is used to identify an initial grain.

A third seed image is computed from the first and second seed images (shown in FIGS. 19 and 20, respectively). The third seed image is shown in FIG. 21 as image 2100 and is created by assigning, in the absolute deviation image (image 2000), high absolute deviation values to the pixels with low average values (for example, the lowest value in a current image) according to the average image (image 1900).

Method 150 continues at step 158, which includes identifying, in the seed image (seed image 2100), a particular seed pixel of a plurality of contiguous pixels that make up an image of a grain of a plurality of grains of the rock sample. Thus, an optimal location for an initial grain pixel is a seed pixel from the third seed image (image 2100) with the lowest value. For example, as shown in image 2200 in FIG. 22, an optimal seed identification is made based on the minimum pixel value on the seed image, where the darkest pixel has a value of 0 and the lightest pixel has a value of 255. The optimal seed pixel or point corresponds to the lowest value pixel and also corresponds to a high homogeneous grain.

Method 150 continues at step 160, which includes determining, with a specified algorithm, a shape of the grain based on the seed pixel.

Figure 22:
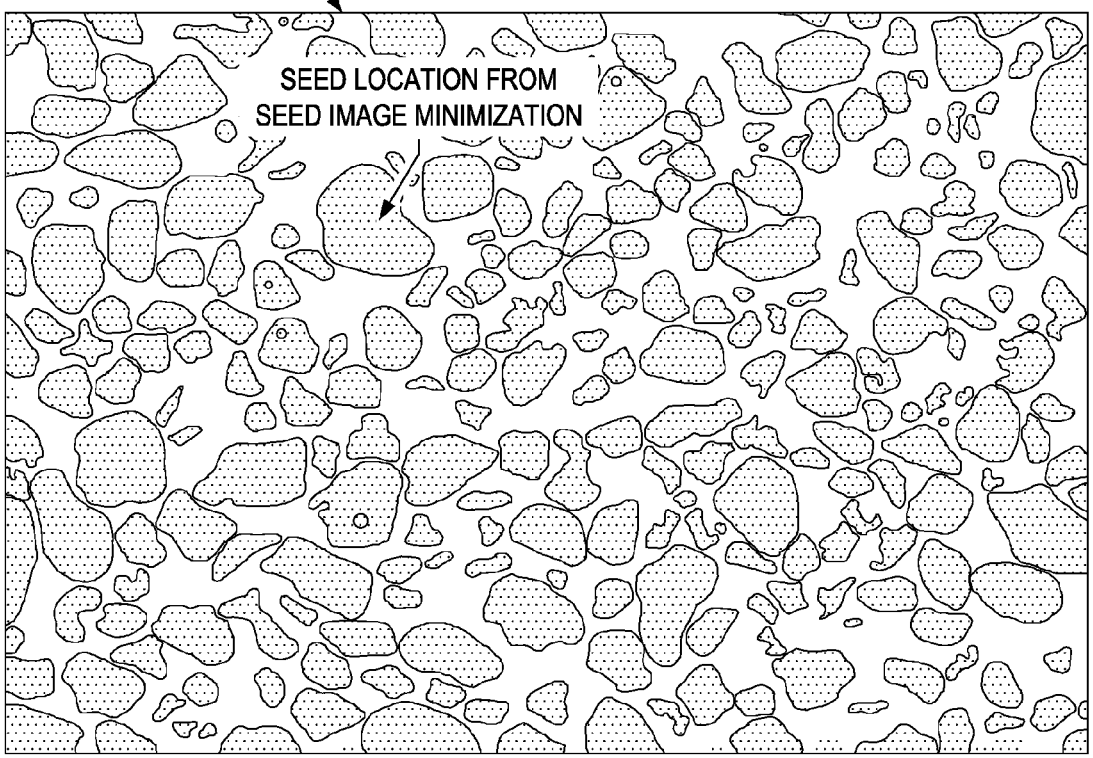
FIG. 22 illustrates a composite image of the geological thin section that is used to identify an optimal initial grain.

FIG. 22 illustrates a composite image 2200 of the geological thin section that is used to identify an optimal initial grain. Image 2200 is the same as image 2100 but also includes a comment regarding seed image location. As described previously, the specified algorithm may be the seeded region growing (SRG) algorithm, which starts with a point (or seed) that belongs to a region of interest (in this instance, the grain of the rock sample 105 in the geological thin section 100). The region is then grown by adding points that are "similar" to the seed pixel.

In an example aspect of step 160, the seed point (or seed pixel) selected in step 158 is added to a sequential search list (SSL) queue. That seed point (or another seed point already included in the SSL queue) is selected from the SSL queue. Next, neighboring points or pixels of the selected seed point of the queue are examined. Although any number of neighboring points or pixels may be examined, in the illustrated implementation, there are eight neighboring points adjacent the selected seed point. For each of the neighboring points, the point is compared for similarity to the selected seed point. If the neighboring point is similar, then that point is added to the region and to the SSL queue.

There are a variety of criteria available for judging whether a neighboring point is "similar" to the seed pixel and to the grain region. In example implementations, the criterion of similarity is based on color similarity. One technique for measuring color similarity is by measuring a Euclidean distance between color vectors of the neighboring point and the seed point (or, generally, between two points of interest). If that measurement is greater than a specified threshold, then the neighboring point and seed point are not similar (or not similar enough to include in the grain region). If that measurement is less than a specified threshold, then the neighboring point and seed point are similar (or similar enough to include in the grain region).

The choice of the specified threshold should be such that it will be large enough to allow for natural variation within the region, but small enough to be able to detect a change from points outside the grain region. Thus, if the threshold is too small, the identified region will be too small. If the threshold is too large, the identified region will be too large (and may include other grains or pores).

The choice of an optimal threshold can be made by trial and error (by a visual comparison of the identified region to the original picture). Because of a variety of colors and brightness levels present in the same image, different grains may have different optimal thresholds. In some aspects, a single threshold value may be used for all grains in a geological thin section 100. In other aspects, for example because of a wide range of thresholds and the relative sensitivity of grain identification to the choice of threshold, an optimal threshold may be chosen separately for each grain. For example, to decide if the neighboring point from the SSL queue is similar to the seed pixel and should be integrated into the grain region, an absolute deviation of the color values of the neighboring point may be determined. An absolute variation higher than a threshold means that the window is crossing either another grain or a pore space. In some aspects, the threshold may not be grain dependent, but instead is fixed for a number (for example, an entire set) of geological thin sections (for example, from the same depositional environment). A default value of the threshold can be used (for example, as determined from previous tests). The default value may also be adjusted based on, for example, analysis of the set of geological thin sections.

Figure 23:
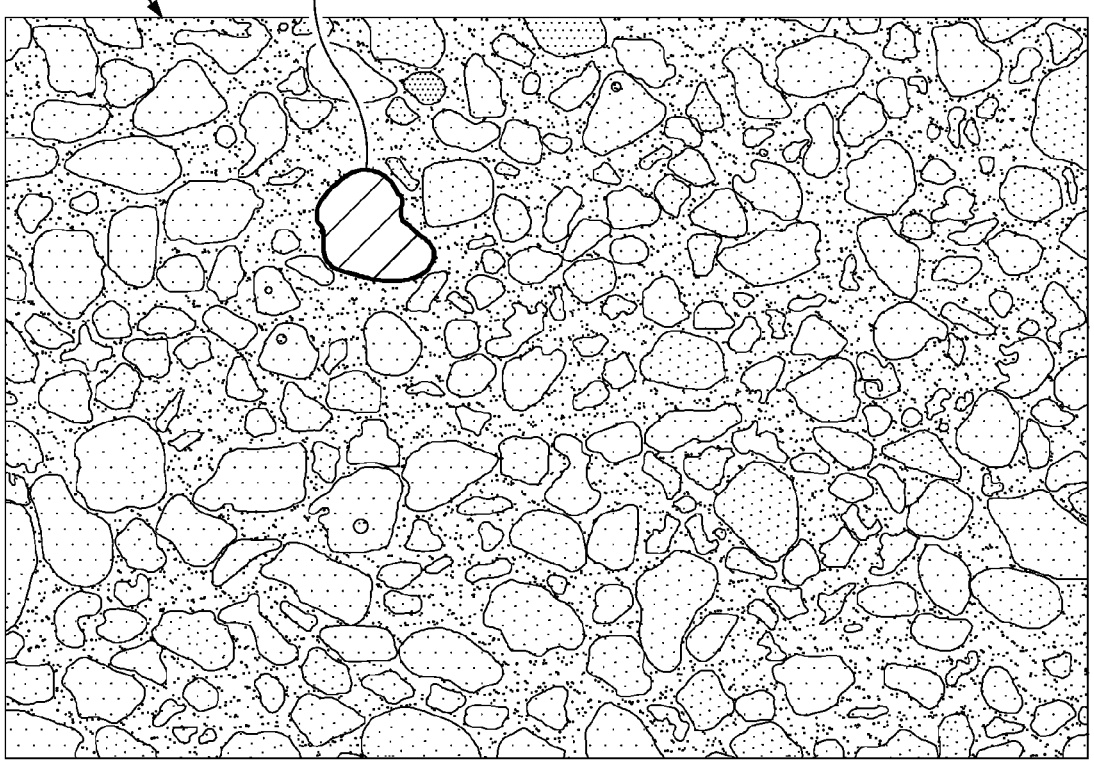
FIG. 23 illustrates an image of the geological thin section in which an initial grain shape has been identified.

The process of comparing each of the neighboring points to the selected seed point may continue until the SSL queue is empty. Once empty, the particular grain has been determined. Further, the shape of the grain that includes the selected seed pixel is determined once the SSL queue is empty. For example, as shown in FIG. 23, a grain 2305 (and its shape) is determined according to step 160 in image 2300.

Figure 26:
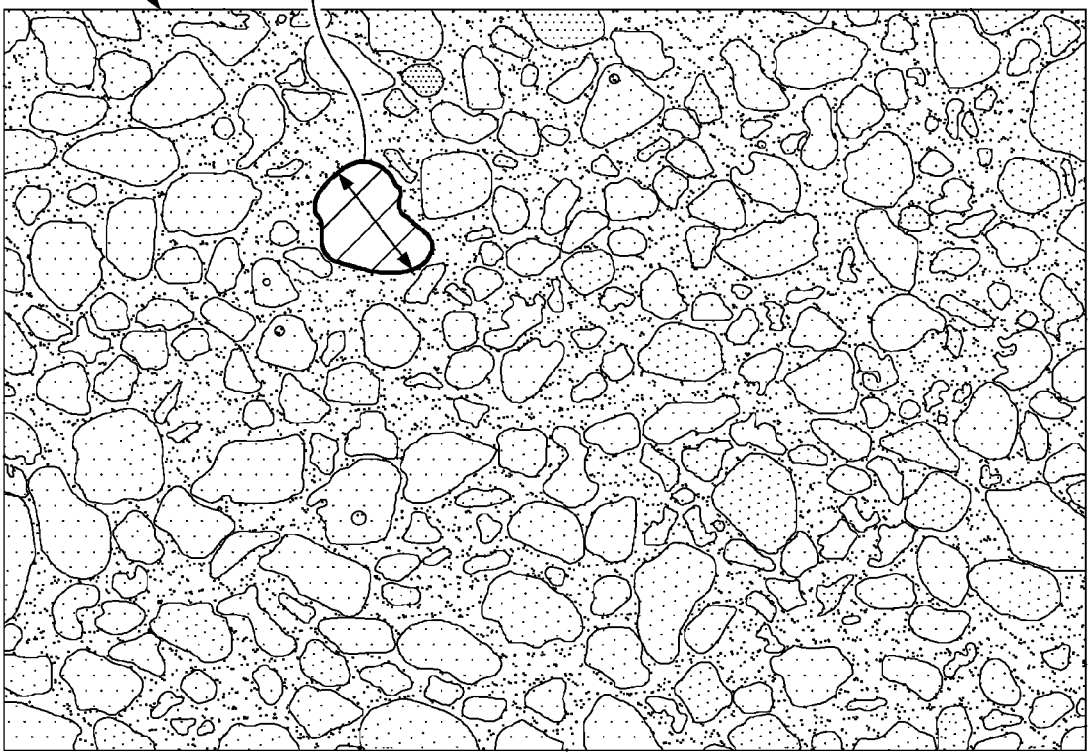
FIGS. 26-27 illustrate composite images of the geological thin section that show grain properties for the identified grain.
Figure 27:
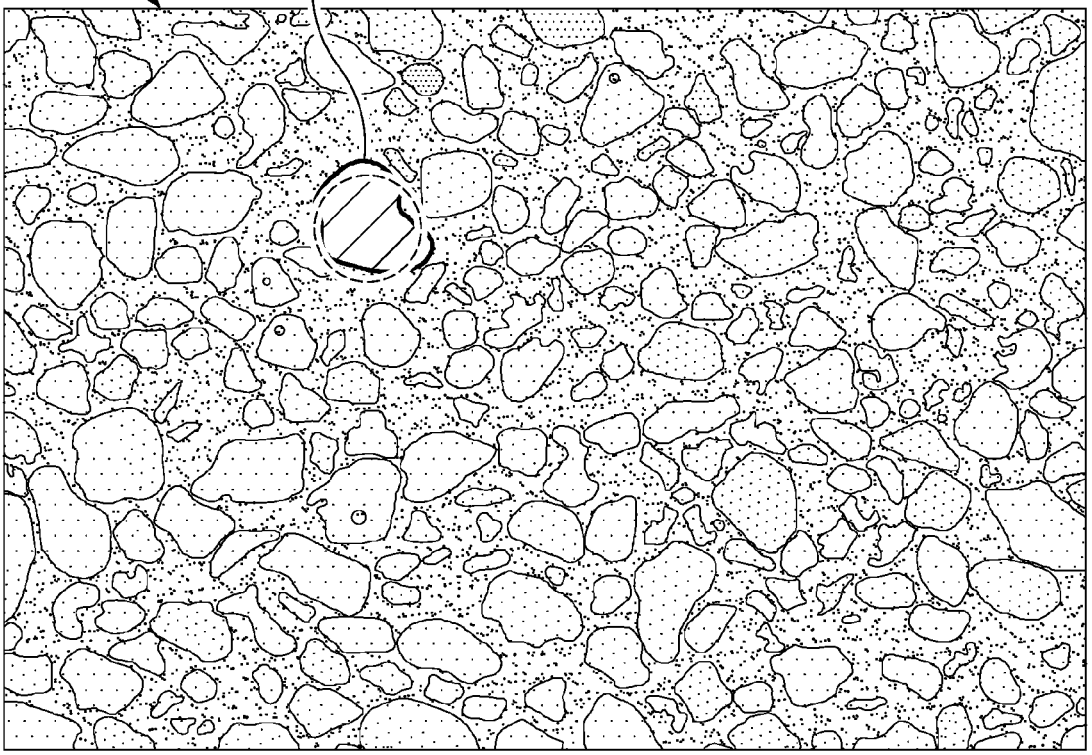

Method 150 continues at step 162, which includes determining, based on the shape of the grain, a size of the grain. Other properties of the grain may also be determined or estimated in step 162. For example, morphological properties of the grain (sphericity, roundness, and otherwise) may also be determined or estimated according to the shape of the grain. In an example aspect, the size of the grain is determined or estimated based on a length of the longest segment inside the grain. FIG. 26 shows an image 2600 of the determined grain with the length 2605 of the grain shown. In another example aspect, the size of the grain is determined or estimated based on a diameter of a circumscribed circle of the grain. FIG. 27 shows an image 2700 of the determined grain with the circumscribed circle 2705 of the grain shown.

Method 150 continues at step 164, which includes a decision of whether the determined size (of step 162) of the grain is greater than a specified threshold. For example, steps 156 through 162 may be repeated in an iterative process to determine a size of each grain of the geological thin section 100. Smaller grains, such as those below the specified threshold, may indicate that the iterative process should be completed. For example, in some aspects of method 150, once any grain is determined to have a size less than the specified threshold, then step 164 may lead to step 168, ending the iterative process. In another implementation of method 150, the iterative process is ended (sending the method to step 168) when a particular number of consecutively analyzed grains of the geological thin section 100 (for example, ten) have determined sizes less than the specified threshold.

In some aspects, the iterative process may be stopped if the determined grain size (or determined grain sizes of a number of consecutive iterations) if the grain sizes are order of magnitudes less than previously-determined sizes. This may indicate an error or that only insignificant grains are left in the geological thin section. For example, grains that are determined to be in the micron range, followed by grains that are determined to be in the nanometer or millimeter range may indicate an error. In such aspects, the maximum and minimum detected sizes can account for such values and either put them in an "error" file or halt the method and indicate to the user that there may be a problem. For example, a "maximum" alert (that is, an alert that indicates a grain size much larger than expected) may be an indication of solid particles of a material like quartz surrounded by a quartz-based cement which gives the same polarity but has a different inherent porosity (false positive or alpha-error). A "minimum" alert may indicate that all significant grains (for example, grains with a size greater than a particular threshold size) have been accounted for in the geological thin section.

Once the decision in step 164 is made to stop the iterative process (a "no"), method 150 continues at step 168, which includes preparing the determination of the size of the grain(s) for presentation to a user. For example, the computing system 280 of the polarizing microscope system 200 may prepare or aggregate grain sizes for a graphical presentation (for example, graphs, tables, or otherwise) through an output device of the system 280. Next, method 150 may continue at step 170, which includes displaying a size distribution of the grains to the user. For instance, as shown in FIG. 28A (discussed in more detail infra), a distribution of grain size illustrated graphically (for example, as number of grains as compared to grain size) may be displayed to the user.

If the decision in step 164 is made to continue the iterative process (a "yes"), method 150 continues at step 166, which includes generating an updated composite image to remove the determined shape of the grain from the composite image. For instance, in order to ensure that a grain is not analyzed two times or more (thereby rendering any analysis results inaccurate), method 150 may effectively remove the image of the grain (that is, the pixels that comprise the grain) from the final composite image (image 1700).

Figure 24:
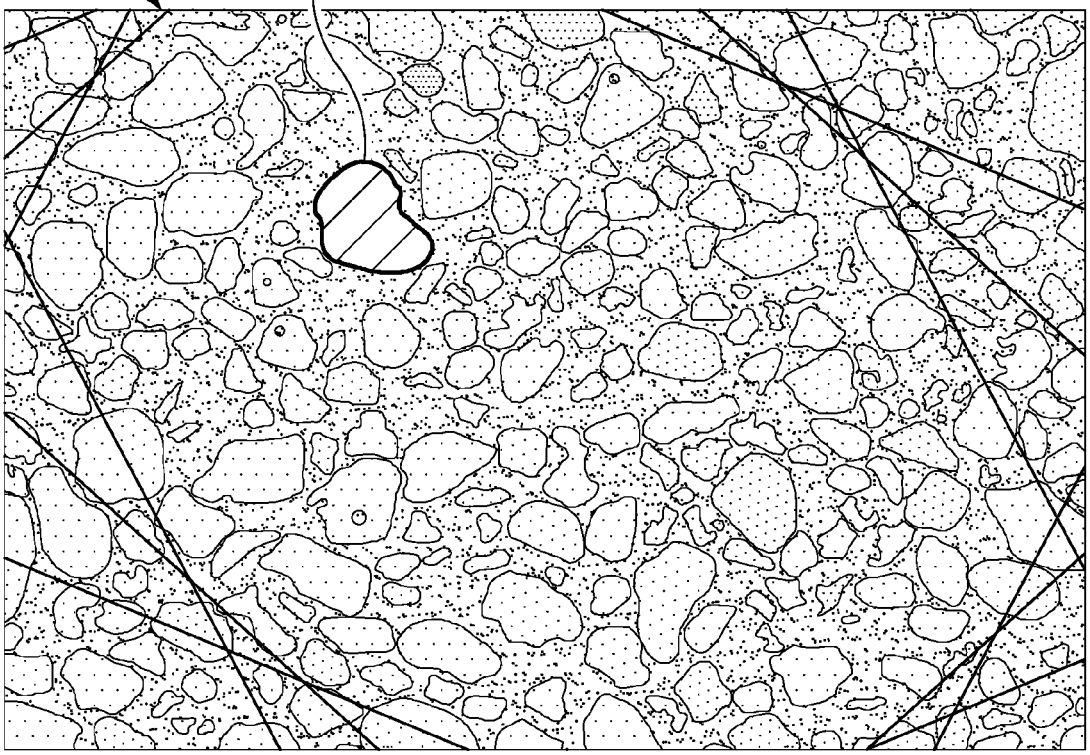
FIG. 24 illustrates a composite image of the geological thin section updated to remove a previously-identified grain.
Figure 25:
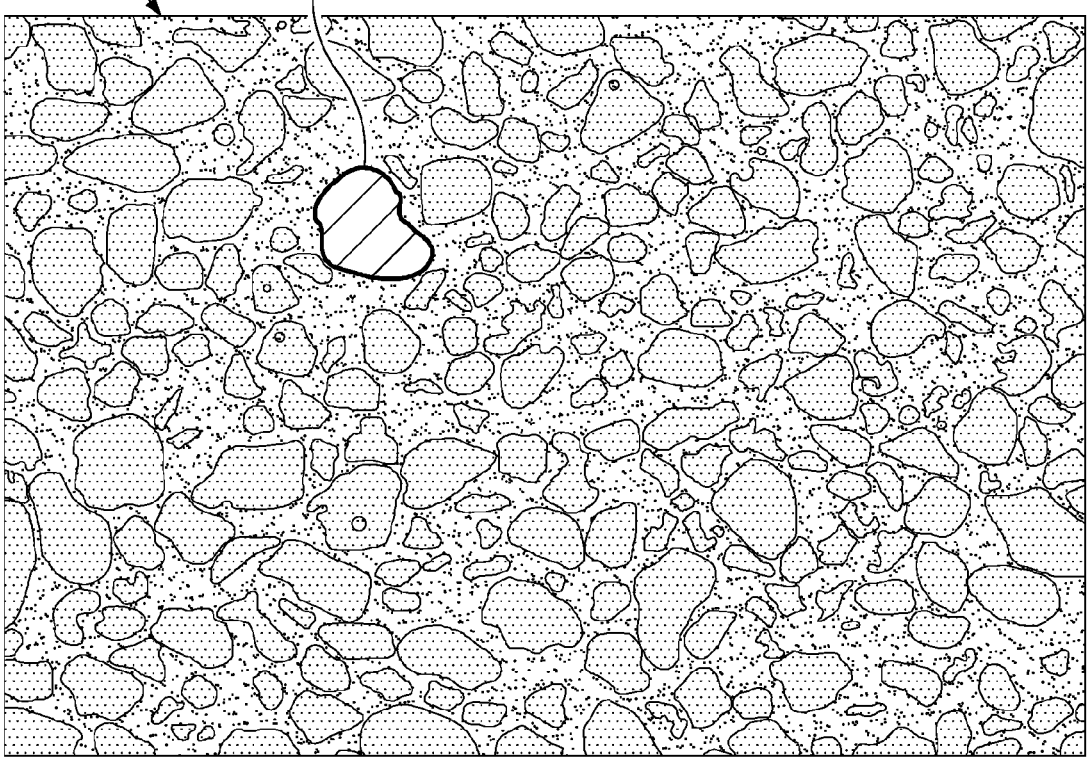
FIG. 25 illustrates a plane-polarized image of the geological thin section updated to remove the previously-identified grain.

In some aspects, removing the determined shape of the grain includes setting the pixels that comprise the grain to nil values. As shown in FIG. 24, an image 2400 includes the grain 2405 removed from the final composite image 1700 based on the pixels of the grain 2405 (determined by the SRG algorithm in step 160) being set to nil values. FIG. 25 also shows an image 2500, which includes the grain 2505 removed from the third composite image 1000 (that is, the plane-polarized image 1000). Based on step 166, the iterative process (including steps 156-164) moves to another grain (a grain not yet analyzed) during a next iteration.

In some implementations, step 166 may be performed subsequent to step 160, Thus, in some implementations, the grain pixels determined in step 160 may be removed (for example, set to nil values) prior to the determination of the size of the grain in step 162.

FIG. 28A illustrates a graph 2800 that shows grain size range of a geological thin section determined by an example method for an image-based analysis of the geological thin section. More specifically, graph 2800 shows the results of a test example of a particular geological thin section on which method 150 was performed. In this example, the particular geological thin section was obtained from a wellbore drilled through the Unayzah A sandstone reservoir ("the sandstone geological thin section"). The sandstone geological thin section was deposited in an eolian setting that forms a dune facies, which showed a high angle planer cross bedding that represent a flow of detrital grains (mainly quartz) on the slip-face of a dune with clear pin-stripping structures.

Application of method 150 to the sandstone geological thin section obtained from this wellbore resulted in a grain size histogram 2815 illustrated in graph 2800. As illustrated, y-axis 2805 represents a number of grains while x-axis 2810 represents grain size in micro meters (μm). The illustrated histogram 2815 includes 142 identified grains of the sandstone geological thin section, which range from 60 μm to 320 μm.

A manual point counting analysis was also performed by a geologist on the sandstone geological thin section. The results of the point counting analysis as compared to the results obtained from method 150 shown in FIG. 28A is shown in FIG. 28B. FIG. 28B illustrates a graph 2850 that shows grain size range of the sandstone geological thin section determined by method 150 as compared to a conventional point counting method of the sandstone geological thin section. As illustrated, graph 2850 includes y-axis 2855 that represents a number of grains while x-axis 2860 represents grain size in micro meters (μm). Histogram 2870 represents the results of method 150 applied to the sandstone geological thin section, while histogram 2865 represents the results of the manual point counting method applied to the sandstone geological thin section.

As the results show, histogram 2865 includes 144 counted grains while histogram 2870 (as noted previously) includes 142 grains. Thus, method 150 resulted in a 99% chance of success in terms of grain detection as compared to the point counting method. Further, the histograms 2865 and 2870 show an excellent agreement between the automated method 150 and the manual point counting method. In addition, the automated method 150 took less than 2% of the time needed to complete the analysis as compared to the point counting method (two minutes as compared to two hours).

Figure 29:
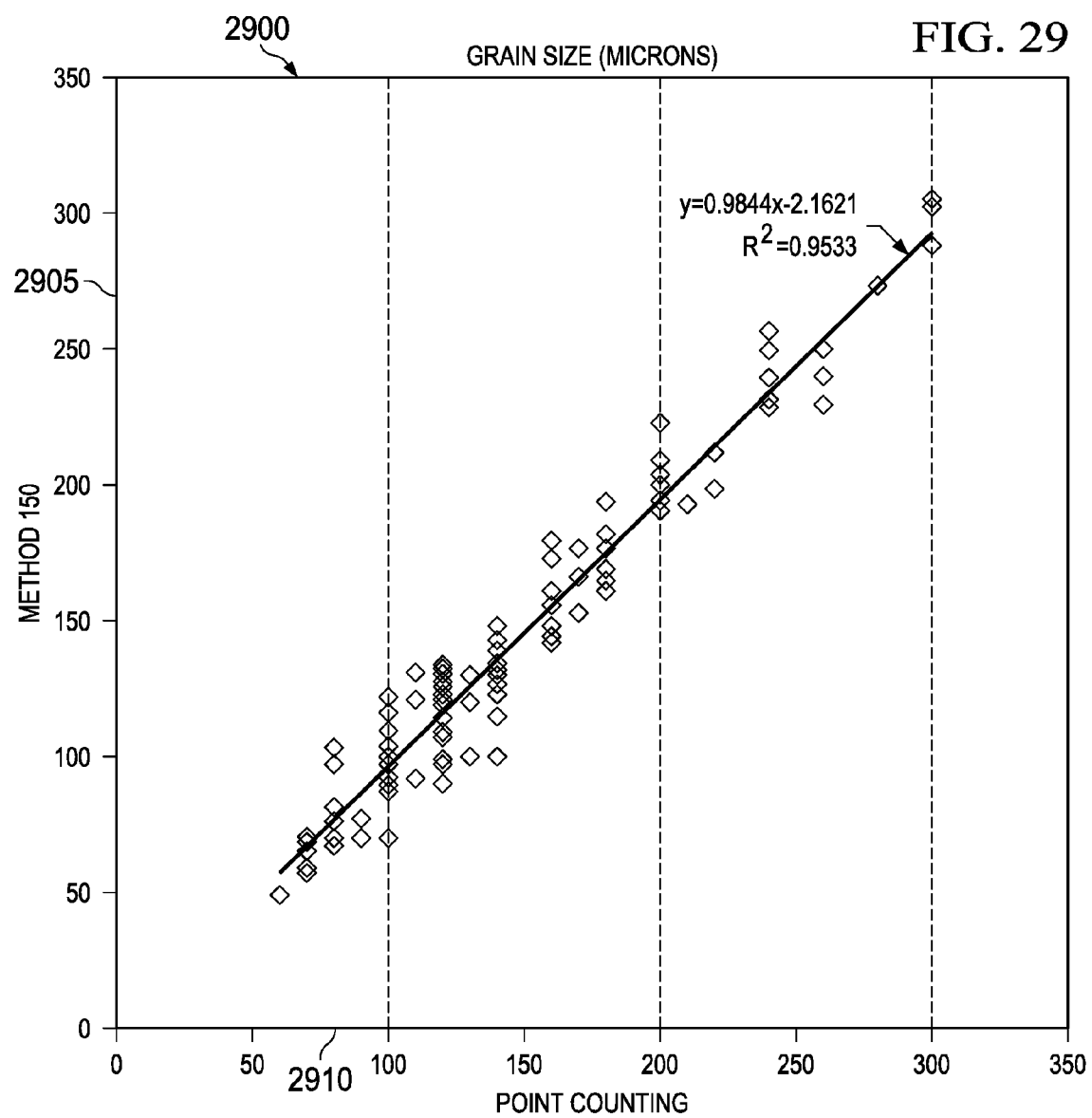
FIG. 29 illustrates a graph that shows grain size range of a geological thin section determined by an example method for an image-based analysis of the geological thin section as compared to a conventional point counting method of the geological thin section.

Continuing, FIG. 29 illustrates a graph 2900 that shows a plot of grain size range of the sandstone geological thin section determined by method 150 as compared to the point counting method. Graph 2900 includes a y-axis 2905 that represents grain size from the automated method 150, while x-axis 2910 represents grain size from the point counting method. As with graph 2800, excellent agreement between the automated method 150 and the manual point counting method is illustrated. A linear regression result is also shown on graph 2900. In some aspects, the linearity of the regression, as well as the R coefficient, may determine an agreement between the results obtained from the automated analysis of method 150 and the manual point counting analysis performed, for example, by a geologist.

Figure 30:
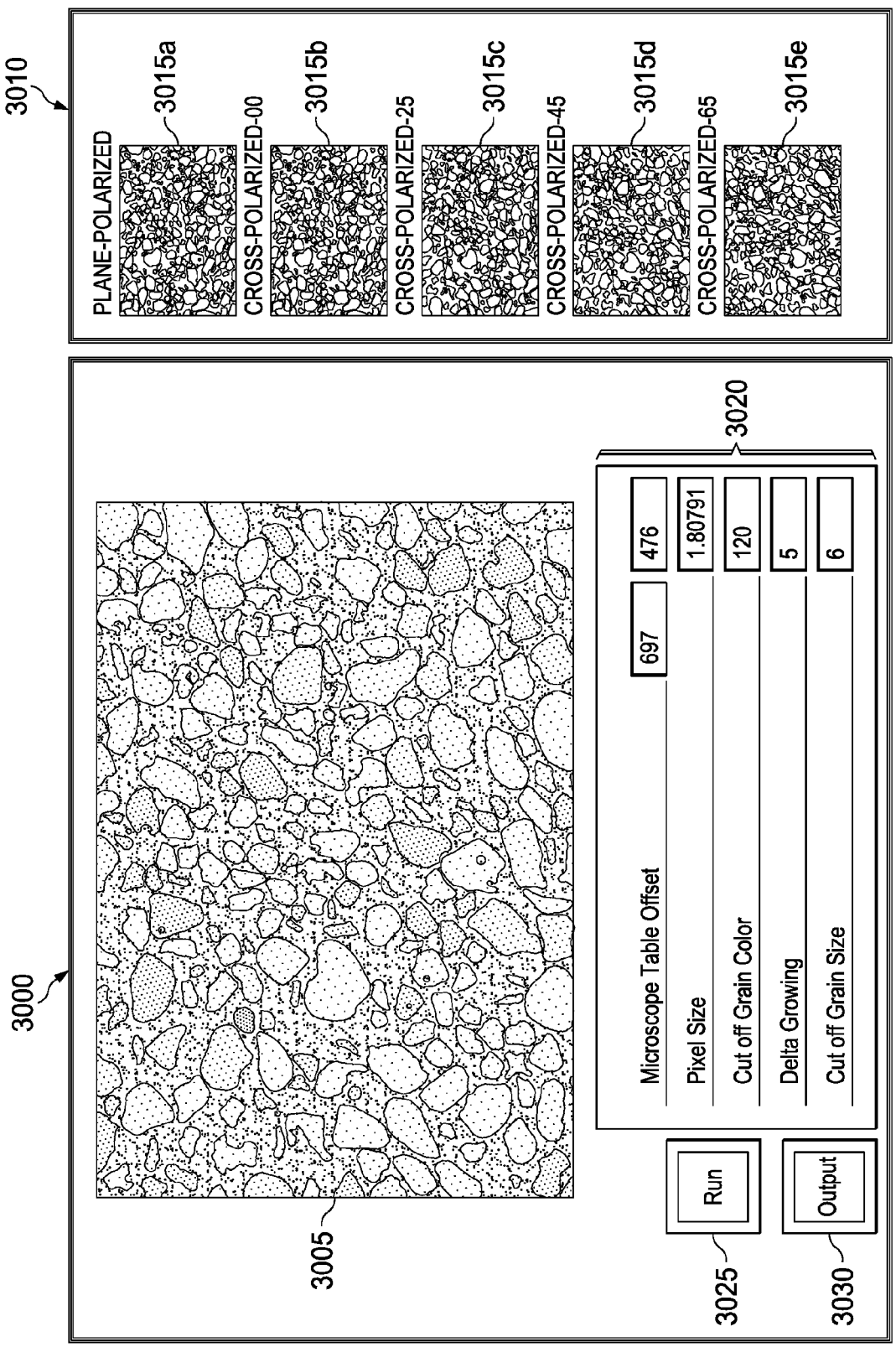
FIG. 30 illustrates an implementation of a graphical user interface (GUI) for a computer-implemented method for an image-based analysis of the geological thin section.

FIG. 30 illustrates an implementation of a graphical user interface (GUI) 3000 for a computer-implemented method for an image-based analysis of the geological thin section. For example, GUI 3000 may represent an example GUI displayed on the computing system 280 of the polarizing microscope system 200 during execution of the automated method 150. In this implementation, the automated method 150 can be applied through a GUI developed in C#, which can be installed on operating systems such as Linux® and Windows®. Through the GUI 3000, a geologist can provide data needed by the automated method 150 (for example, cross- and plane-polarized images acquired with the polarizing microscope system 200). Then the data can be copied automatically from the geologist's workstation to the Linux® or Windows® workstation, where most or many of the steps of method 150 can be executed. Once the execution is completed, the results (images and text files) can be copied back to the geologist workstation. The GUI 3000 can then proceed to the results post-processing by visualizing the grain size histogram as well as images that can help in checking the results (for example, the graphs shown in FIGS. 28A-28B and 29).

As illustrated, this implementation of GUI 3000 includes a main display 3005 that can show a selected image from a library 3010 of images 3015a-3015e to the geologist. The GUI 3000 also includes input/output data 3020 for the geologist (such as inputs for thresholds to be used during execution of the workflow or outputs from the workflow). The GUI 3000 also includes controls 3025 and 3030 to start or stop the execution of the workflow and display the results of the workflow.

Figure 31:
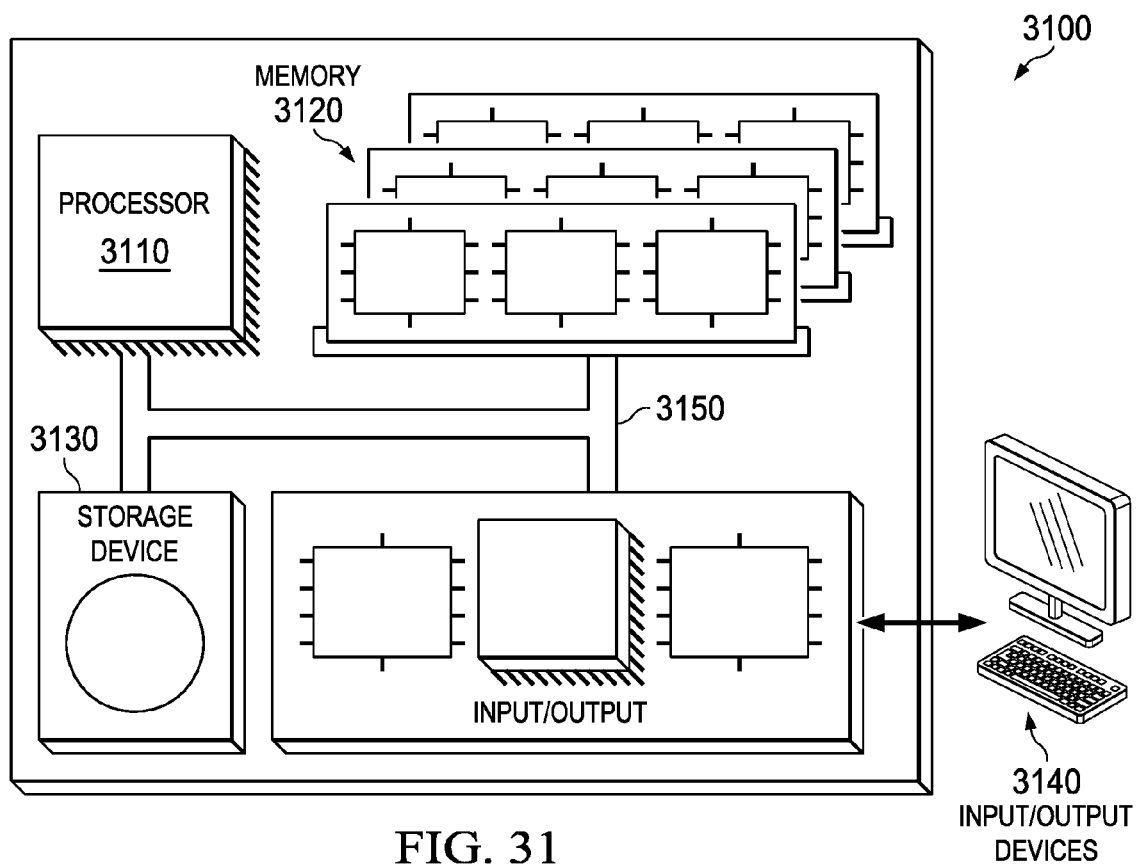
FIG. 31 illustrates a schematic diagram of a computing system for a computer-implemented method for an image-based analysis of the geological thin section.

FIG. 31 illustrates a schematic diagram of a computing system for a computer-implemented method for an image-based analysis of the geological thin section. The system 3100 can be used for the operations described in association with any of the computer-implemented methods described previously, for example as the computing system 280 that is included within the polarizing microscope system 200 shown in FIG. 2.

The system 3100 is intended to include various forms of digital computers, such as laptops, desktops, workstations, personal digital assistants, servers, blade servers, mainframes, and other appropriate computers. The system 3100 can also include mobile devices, such as personal digital assistants, cellular telephones, smartphones, and other similar computing devices. Additionally the system can include portable storage media, such as, Universal Serial Bus (USB) flash drives. For example, the USB flash drives may store operating systems and other applications. The USB flash drives can include input/output components, such as a wireless transmitter or USB connector that may be inserted into a USB port of another computing device.

The system 3100 includes a processor 3110, a memory 3120, a storage device 3130, and an input/output device 3140. Each of the components 3110, 3120, 3130, and 3140 are interconnected using a system bus 3150. The processor 3110 is capable of processing instructions for execution within the system 3100. The processor may be designed using any of a number of architectures. For example, the processor 3110 may be a CISC (Complex Instruction Set Computers) processor, a RISC (Reduced Instruction Set Computer) processor, or a MISC (Minimal Instruction Set Computer) processor.

In one implementation, the processor 3110 is a single-threaded processor. In another implementation, the processor 3110 is a multi-threaded processor. The processor 3110 is capable of processing instructions stored in the memory 3120 or on the storage device 3130 to display graphical information for a user interface on the input/output device 3140.

The memory 3120 stores information within the system 3100. In one implementation, the memory 3120 is a computer-readable medium. In one implementation, the memory 3120 is a volatile memory unit. In another implementation, the memory 3120 is a non-volatile memory unit. In some implementations, the control modules herein may not include a memory module 3120.

The storage device 3130 is capable of providing mass storage for the system 3100. In one implementation, the storage device 3130 is a computer-readable medium. In various different implementations, the storage device 3130 may be a floppy disk device, a hard disk device, an optical disk device, or a tape device.

The input/output device 3140 provides input/output operations for the system 3100. In one implementation, the input/output device 3140 includes a keyboard and/or pointing device. In another implementation, the input/output device 3140 includes a display unit for displaying graphical user interfaces.

The features described can be implemented in digital electronic circuitry, or in computer hardware, firmware, software, or in combinations of them. The apparatus can be implemented in a computer program product tangibly embodied in an information carrier, for example, in a machine-readable storage device for execution by a programmable processor, and method steps can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. The essential elements of a computer are a processor for executing instructions and one or more memories for storing instructions and data. Generally, a computer will also include, or be operatively coupled to communicate with, one or more mass storage devices for storing data files. Such devices include magnetic disks, such as internal hard disks and removable disks, magneto-optical disks, and optical disks. Storage devices suitable for tangibly embodying computer program instructions and data include all forms of non-volatile memory, including by way of example semiconductor memory devices, such as EPROM, EEPROM, and flash memory devices, magnetic disks such as internal hard disks and removable disks, magneto-optical disks, and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a keyboard and a pointing device such as a mouse or a trackball by which the user can provide input to the computer. Additionally, such activities can be implemented via touch-screen flat-panel displays and other appropriate mechanisms.

The features can be implemented in a control system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include a local area network ("LAN"), a wide area network ("WAN"), peer-to-peer networks (having ad-hoc or static members), grid computing infrastructures, and the Internet.

While this specification contains many specific implementation details, these should not be construed as limitations on the scope of any inventions or of what may be claimed, but rather as descriptions of features specific to particular implementations of particular inventions. Certain features that are described in this specification in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

A number of implementations have been described. Nevertheless, it will be understood that various modifications may be made without departing from the spirit and scope of the disclosure. For example, example operations, methods, and/or processes described herein may include more steps or fewer steps than those described. Further, the steps in such example operations, methods, and/or processes may be performed in different successions than that described or illustrated in the figures. Accordingly, other implementations are within the scope of the following claims.

What is claimed is:

1. A computer-implemented method for an image-based analysis of a geological thin section, comprising:
   (i) acquiring a plurality of images from a geological thin section of a rock sample from a subterranean zone, wherein acquiring a plurality of images from a geological thin section of a rock sample from a subterranean zone comprises:
      acquiring at least one plane-polarized image from the geological thin section by acquiring four plane-polarized images from the geological thin section, each plane-polarized image rotated at a distinct angle relative to a zero position angle, from the geological thin section, and
      acquiring at least two cross-polarized images from the geological thin section by acquiring four cross-polarized images from the geological thin section, each cross-polarized image rotated at the distinct angle relative to the zero position angle, from the geological thin section;
   (ii) manipulating the plurality of images to derive a composite image, wherein manipulating the plurality of images to derive the composite image comprises:
      registering the plurality of images, the registering comprising determining a rotational center for each of the plurality of images about which to apply a rotational transformation,
      applying the rotational transformation to each of the plurality of images with a rotation angle equal to an opposite value of the distinct angles relative to the zero position angle,
      generating a first composite image,
      generating a second composite image, and
      generating a third composite image, wherein the first composite image is generated by applying an edge detection algorithm to the at least two cross-polarized images, and the first composite image comprises an aggregation of a plurality of first composite images, with each first composite image corresponding to a particular one of the plurality of cross-polarized images;
   (iii) optimizing the composite image to derive a seed image;
   (iv) identifying, in the seed image, a particular seed pixel of a plurality of contiguous pixels that comprise an image of a grain of a plurality of grains of the rock sample in the seed image;
   (v) determining, with a specified algorithm, a shape of the grain based on the seed pixel;
   (vi) determining, based on the shape of the grain, a size of the grain; and
   (vii) preparing the determination of the size of the grain for presentation to a user.

2. The computer-implemented method of claim 1, further comprising determining, based on the shape of the grain, at least one of a sphericity, a roundness, an elongation, or a sharpness of the grain.

3. The computer-implemented method of claim 1, further comprising generating an updated composite image to remove the shape of the grain from the composite image by setting the plurality of contiguous pixels that comprise the image of the grain to nil values.

4. The computer-implemented method of claim 1, wherein the distinct angles comprise 0 degrees, 25 degrees, 45 degrees, and 65 degrees from the zero position angle.

5. The computer-implemented method of claim 1, wherein the second composite image comprises a combined cross-polarized image based on the first composite image, the combined cross-polarized image comprising an average cross-polarized image based on the plurality of first composite images.

6. The computer-implemented method of claim 5, wherein the third composite image comprises a segmented image of the at least one plane-polarized image, the segmented image generated by:
   determining a cut-off value of a color that distinguishes the grain of the geological thin section and a pore of the geological thin section, the determined cut-off value based on a color of an epoxy of the geological thin section; and
   applying the cut-off value to the at least one plane-polarized image.

7. The computer-implemented method of claim 6, wherein manipulating the plurality of images to derive a composite image comprises generating a final composite image used to derive the seed image by tagging grain edges of the plurality of grains in the third composite image based on the first composite image to create the final composite image.

8. The computer-implemented method of claim 7, wherein optimizing the composite image to derive the seed image comprises:
   generating a first seed image based on an average of the final composite image;
   generating a second seed image based on an absolute deviation or a standard deviation of the first seed image; and
   generating a third seed image by assigning, in the second seed image, an absolute deviation value for each pixel in the second seed image that comprises an average value lower than a threshold.

9. The computer-implemented method of claim 8, further comprising selecting the seed pixel from the third seed image based on the lowest average value of the pixels.

10. The computer-implemented method of claim 9, wherein the specified algorithm comprises a seeded region growing algorithm (SRG), the method further comprising:
    adding the seed pixel to a sequential search list (SSL) queue; and
    determining, with the SRG, a shape of the grain based on the seed pixel by:
       selecting the seed pixel from the SSL queue; and
       for each of a plurality of neighboring pixels adjacent the seed pixel:
          determining a color similarity of the neighboring pixel to the seed pixel; and
          based on the color similarity of the neighboring pixel meeting a threshold color similarity, adding the neighboring pixel to the grain shape.

11. The computer-implemented method of claim 10, wherein determining a color similarity of the neighboring pixel to the seed image comprises measuring a Euclidean distance between a color vector of the seed pixel and a color vector of the neighboring pixel, and the threshold color similarity comprises a maximum value of the Euclidean distance.

12. The computer-implemented method of claim 1, wherein determining, based on the shape of the grain, a size of the grain, comprises at least one of:
   determining a length of a longest segment inside the grain; or
   determining a diameter of a circumscribed circle of the grain.

13. The computer-implemented method of claim 1, further comprising:
   executing an iterative process by repeating steps (iii)-(vi) for another grain of the plurality of grains of the rock sample; and
   stopping the iterative process when the determined grain size of a particular grain of the plurality of grains is less than a specified threshold grain size.

14. The computer-implemented method of claim 1, wherein the rock sample comprises an anisotropic rock sample or a clastic rock sample.

15. A system for an image-based analysis of a geological thin section, comprising:
   a polarizing microscope; and
   a control system that comprises a memory and one or more processors, the memory comprising instructions operable when executed by the one or more processors to perform operations comprising:
      (i) acquiring a plurality of images from a geological thin section of a rock sample from a subterranean zone, wherein acquiring a plurality of images from a geological thin section of a rock sample from a subterranean zone comprises:
         acquiring at least one plane-polarized image from the geological thin section by acquiring four plane-polarized images from the geological thin section, each plane-polarized image rotated at a distinct angle relative to a zero position angle, from the geological thin section, and
         acquiring at least two cross-polarized images from the geological thin section by acquiring four cross-polarized images from the geological thin section, each cross-polarized image rotated at the distinct angle relative to the zero position angle, from the geological thin section;
      (ii) manipulating the plurality of images to derive a composite image, wherein manipulating the plurality of images to derive the composite image comprises:
         registering the plurality of images, the registering comprising determining a rotational center for each of the plurality of images about which to apply a rotational transformation,
         applying the rotational transformation to each of the plurality of images with a rotation angle equal to an opposite value of the distinct angles relative to the zero position angle,
         generating a first composite image,
         generating a second composite image, and
         generating a third composite image, wherein the first composite image is generated by applying an edge detection algorithm to the at least two cross-polarized images, and the first composite image comprises an aggregation of a plurality of first composite images, with each first composite image corresponding to a particular one of the plurality of cross-polarized images;
      (iii) optimizing the composite image to derive a seed image;
      (iv) identifying, in the seed image, a particular seed pixel of a plurality of contiguous pixels that comprise an image of a grain of a plurality of grains of the rock sample in the seed image;
      (v) determining, with a specified algorithm, a shape of the grain based on the seed pixel;
      (vi) determining, based on the shape of the grain, a size of the grain; and
      (vii) preparing the determination of the size of the grain for presentation to a user.

16. The system of claim 15, wherein the operations further comprise determining, based on the shape of the grain, at least one of a sphericity, a roundness, an elongation, or a sharpness of the grain.

17. The system of claim 15, wherein the operations further comprise generating an updated composite image to remove the shape of the grain from the composite image by setting the plurality of contiguous pixels that comprise the image of the grain to nil values.

18. The system of claim 15, wherein the distinct angles comprise 0 degrees, 25 degrees, 45 degrees, and 65 degrees from the zero position angle.

19. The system of claim 15, wherein the second composite image comprises a combined cross-polarized image based on the first composite image, the combined cross-polarized image comprising an average cross-polarized image based on the plurality of first composite images.

20. The system of claim 19, wherein the third composite image comprises a segmented image of the at least one plane-polarized image, the segmented image generated by:
   determining a cut-off value of a color that distinguishes the grain of the geological thin section and a pore of the geological thin section, the determined cut-off value based on a color of an epoxy of the geological thin section; and
   applying the cut-off value to the at least one plane-polarized image.

21. The system of claim 20, wherein manipulating the plurality of images to derive a composite image comprises generating a final composite image used to derive the seed image by tagging grain edges of the plurality of grains in the third composite image based on the first composite image to create the final composite image.

22. The system of claim 21, wherein optimizing the composite image to derive the seed image comprises:
   generating a first seed image based on an average of the final composite image;
   generating a second seed image based on an absolute deviation or a standard deviation of the first seed image; and
   generating a third seed image by assigning, in the second seed image, an absolute deviation value for each pixel in the second seed image that comprises an average value lower than a threshold.

23. The system of claim 22, wherein the operations further comprise selecting the seed pixel from the third seed image based on the lowest average value of the pixels.

24. The system of claim 23, wherein the specified algorithm comprises a seeded region growing algorithm (SRG), the method further comprising:
   adding the seed pixel to a sequential search list (SSL) queue; and
   determining, with the SRG, a shape of the grain based on the seed pixel by:
      selecting the seed pixel from the SSL queue; and
      for each of a plurality of neighboring pixels adjacent the seed pixel:
         determining a color similarity of the neighboring pixel to the seed pixel; and based on the color similarity of the neighboring pixel meeting a threshold color similarity, adding the neighboring pixel to the grain shape.

25. The system of claim 24, wherein determining a color similarity of the neighboring pixel to the seed image comprises measuring a Euclidean distance between a color vector of the seed pixel and a color vector of the neighboring pixel, and the threshold color similarity comprises a maximum value of the Euclidean distance.

26. The system of claim 15, wherein determining, based on the shape of the grain, a size of the grain, comprises at least one of:
   determining a length of a longest segment inside the grain; or
   determining a diameter of a circumscribed circle of the grain.

27. The system of claim 15, wherein the operations further comprise:
   executing an iterative process by repeating steps (iii)-(vi) for another grain of the plurality of grains of the rock sample; and
   stopping the iterative process when the determined grain size of a particular grain of the plurality of grains is less than a specified threshold grain size.

28. The system of claim 15, wherein the rock sample comprises an anisotropic rock sample or a clastic rock sample.

* * * * *